(12) United States Patent
LaGrandeur et al.

(10) Patent No.: US 8,613,200 B2
(45) Date of Patent: Dec. 24, 2013

(54) HEATER-COOLER WITH BITHERMAL THERMOELECTRIC DEVICE

(75) Inventors: John LaGrandeur, Arcadia, CA (US); Lon E. Bell, Altadena, CA (US)

(73) Assignee: BSST LLC, Azusa, CA (US)

( * ) Notice: Subject to any disclaimer, the term of this patent is extended or adjusted under 35 U.S.C. 154(b) by 580 days.

(21) Appl. No.: 12/605,249

(22) Filed: Oct. 23, 2009

(65) Prior Publication Data
US 2010/0101238 A1    Apr. 29, 2010

Related U.S. Application Data

(60) Provisional application No. 61/108,004, filed on Oct. 23, 2008.

(51) Int. Cl.
*F25B 21/02* (2006.01)
*B60H 1/00* (2006.01)
*B60H 3/00* (2006.01)

(52) U.S. Cl.
USPC ......... 62/3.61; 62/3.2; 62/3.3; 62/3.4; 62/3.6; 165/41; 165/42

(58) Field of Classification Search
USPC ................. 62/3.2, 3.3, 3.61, 239, 244, 238
See application file for complete search history.

(56) References Cited

U.S. PATENT DOCUMENTS

| | | | |
|---|---|---|---|
| 413,136 A | 10/1889 | Dewey | |
| 1,120,781 A | 12/1914 | Altenkirch et al. | |
| 2,363,168 A | 11/1944 | Findley | |
| 2,944,404 A | 7/1960 | Fritts | |
| 2,949,014 A | 8/1960 | Belton, Jr. et al. | |
| 2,984,077 A | 5/1961 | Gaskill | |
| 2,992,538 A | 7/1961 | Siegfried | |
| 2,997,514 A | 8/1961 | Roeder, Jr. | |
| 3,004,393 A | 10/1961 | Alsing | |
| 3,006,979 A | 10/1961 | Rich | |

(Continued)

FOREIGN PATENT DOCUMENTS

| CN | 1195090 | 10/1998 |
|---|---|---|
| CN | 1249067 A | 3/2000 |

(Continued)

OTHER PUBLICATIONS

International Search Report and Written Opinion dated Jan. 19, 2010, Application No. PCT/US2009/061944, filed Oct. 23, 2009.

(Continued)

*Primary Examiner* — Frantz Jules
*Assistant Examiner* — Keith Raymond
(74) *Attorney, Agent, or Firm* — Knobbe, Martens, Olsen & Bear, LLP

(57) ABSTRACT

Disclosed embodiments include systems for heating and cooling the interior climate of a vehicle. In some embodiments, the system comprises a conduit having a first fluid channel, a second fluid channel, a fluid diversion channel configured to divert fluid flow between the first and second channels, and a thermoelectric device operatively connected to the fluid conduit. In certain embodiments, the thermoelectric device comprises a plurality of thermal zones. In some embodiments, the plurality of thermal zones comprises a first thermal zone connected to a first electric circuit switchable between a first polarity and a second polarity and a second thermal zone connected to a second electric circuit switchable between the first polarity and the second polarity independent of the polarity of the first electric circuit.

24 Claims, 5 Drawing Sheets

(56) References Cited

U.S. PATENT DOCUMENTS

| | | |
|---|---|---|
| 3,019,609 A | 2/1962 | Pietsch |
| 3,071,495 A | 1/1963 | Hanlein |
| 3,085,405 A | 4/1963 | Frantti |
| 3,125,860 A | 3/1964 | Reich |
| 3,137,142 A | 6/1964 | Venema |
| 3,138,934 A | 6/1964 | Roane |
| 3,178,895 A | 4/1965 | Mole et al. |
| 3,197,342 A | 7/1965 | Neild, Jr. |
| 3,212,275 A | 10/1965 | Tillman, Jr. |
| 3,213,630 A | 10/1965 | Mole |
| 3,236,056 A | 2/1966 | Phillips et al. |
| 3,252,504 A | 5/1966 | Newton |
| 3,391,727 A | 7/1968 | Armenag Topouszian |
| 3,505,728 A | 4/1970 | Hare et al. |
| 3,522,106 A | 7/1970 | Debiesse et al. |
| 3,527,621 A | 9/1970 | Newton |
| 3,554,815 A | 1/1971 | Osborn |
| 3,599,437 A | 8/1971 | Panas |
| 3,607,444 A | 9/1971 | Debucs |
| 3,626,704 A | 12/1971 | Coe, Jr. |
| 3,635,037 A | 1/1972 | Hubert |
| 3,663,307 A | 5/1972 | Mole |
| 3,681,929 A | 8/1972 | Schering |
| 3,726,100 A | 4/1973 | Widakowich |
| 3,779,307 A | 12/1973 | Weiss et al. |
| 3,817,043 A | 6/1974 | Zoleta |
| 3,885,126 A | 5/1975 | Sugiyama et al. |
| 3,958,324 A | 5/1976 | Alais et al. |
| 4,038,831 A | 8/1977 | Gaudel et al. |
| 4,047,093 A | 9/1977 | Levoy |
| 4,051,691 A | 10/1977 | Dawkins |
| 4,055,053 A | 10/1977 | Elfving |
| 4,056,406 A | 11/1977 | Markman et al. |
| 4,065,936 A | 1/1978 | Fenton et al. |
| 4,125,122 A | 11/1978 | Stachurski |
| 4,280,330 A | 7/1981 | Harris et al. |
| 4,281,516 A | 8/1981 | Berthet et al. |
| 4,297,841 A | 11/1981 | Cheng |
| 4,297,849 A | 11/1981 | Buffet |
| 4,402,188 A | 9/1983 | Skala |
| 4,420,940 A | 12/1983 | Buffet |
| 4,444,851 A | 4/1984 | Maru |
| 4,448,028 A | 5/1984 | Chao et al. |
| 4,494,380 A | 1/1985 | Cross |
| 4,499,329 A | 2/1985 | Benicourt et al. |
| 4,595,297 A | 6/1986 | Liu et al. |
| 4,634,803 A | 1/1987 | Mathiprakasam |
| 4,665,707 A | 5/1987 | Hamilton |
| 4,665,971 A | 5/1987 | Sakurai |
| 4,730,459 A | 3/1988 | Schicklin et al. |
| 4,753,682 A | 6/1988 | Cantoni |
| 4,802,929 A | 2/1989 | Schock |
| 4,823,554 A | 4/1989 | Trachtenberg et al. |
| 4,848,090 A | 7/1989 | Peters |
| 4,858,069 A | 8/1989 | Hughes |
| 4,905,475 A | 3/1990 | Tuomi |
| 4,907,060 A | 3/1990 | Nelson et al. |
| 4,922,721 A | 5/1990 | Robertson et al. |
| 4,922,998 A | 5/1990 | Carr |
| 4,947,735 A | 8/1990 | Guillemin |
| 4,988,847 A | 1/1991 | Argos et al. |
| 4,989,626 A | 2/1991 | Takagi et al. |
| 5,006,178 A | 4/1991 | Bijvoets |
| 5,029,446 A | 7/1991 | Suzuki |
| 5,038,569 A | 8/1991 | Shirota et al. |
| 5,042,566 A | 8/1991 | Hildebrand |
| 5,092,129 A | 3/1992 | Bayes et al. |
| 5,097,829 A | 3/1992 | Quisenberry |
| 5,111,664 A | 5/1992 | Yang |
| 5,119,640 A | 6/1992 | Conrad |
| 5,167,129 A | 12/1992 | Akasaka |
| 5,171,372 A | 12/1992 | Recine, Sr. |
| 5,180,293 A | 1/1993 | Hartl |
| 5,193,347 A | 3/1993 | Apisdorf |
| 5,198,930 A | 3/1993 | Muratomi |
| 5,228,923 A | 7/1993 | Hed |
| 5,232,516 A | 8/1993 | Hed |
| 5,254,178 A | 10/1993 | Yamada et al. |
| 5,269,146 A | 12/1993 | Kerner |
| 5,291,960 A | 3/1994 | Brandenburg et al. |
| 5,300,197 A | 4/1994 | Mitani et al. |
| 5,303,771 A | 4/1994 | Des Champs |
| 5,316,078 A | 5/1994 | Cesaroni |
| 5,385,020 A | 1/1995 | Gwilliam et al. |
| 5,386,823 A | 2/1995 | Chen |
| 5,407,130 A | 4/1995 | Uyeki et al. |
| 5,419,780 A | 5/1995 | Suski |
| 5,419,980 A | 5/1995 | Okamoto et al. |
| 5,429,680 A | 7/1995 | Fuschetti |
| 5,430,322 A | 7/1995 | Koyanagi et al. |
| 5,431,021 A | 7/1995 | Gwilliam et al. |
| 5,448,891 A | 9/1995 | Nakagiri et al. |
| 5,450,894 A | 9/1995 | Inoue et al. |
| 5,456,081 A | 10/1995 | Chrysler et al. |
| 5,483,807 A | 1/1996 | Abersfelder et al. |
| 5,499,504 A | 3/1996 | Mill et al. |
| 5,544,487 A | 8/1996 | Attey et al. |
| 5,549,153 A | 8/1996 | Baruschke et al. |
| 5,561,981 A | 10/1996 | Quisenberry et al. |
| 5,566,774 A | 10/1996 | Yoshida |
| 5,576,512 A | 11/1996 | Doke |
| 5,584,183 A | 12/1996 | Wright et al. |
| 5,592,363 A | 1/1997 | Atarashi et al. |
| 5,594,609 A | 1/1997 | Lin |
| 5,605,047 A | 2/1997 | Park et al. |
| 5,653,111 A | 8/1997 | Attey et al. |
| 5,673,964 A | 10/1997 | Roan et al. |
| 5,682,748 A | 11/1997 | DeVilbiss et al. |
| 5,705,770 A | 1/1998 | Ogassawara et al. |
| 5,713,426 A | 2/1998 | Okamura |
| 5,722,249 A | 3/1998 | Miller, Jr. |
| 5,724,818 A | 3/1998 | Iwata et al. |
| 5,725,048 A | 3/1998 | Burk et al. |
| 5,802,856 A | 9/1998 | Schaper et al. |
| 5,816,236 A | 10/1998 | Moroi et al. |
| 5,822,993 A | 10/1998 | Attey |
| 5,860,472 A | 1/1999 | Batchelder |
| 5,867,990 A | 2/1999 | Ghoshal |
| 5,890,371 A | 4/1999 | Rajasubramanian et al. |
| 5,899,086 A | 5/1999 | Noda et al. |
| 5,901,572 A | 5/1999 | Peiffer et al. |
| RE36,242 E | 6/1999 | Apisdorf |
| 5,918,930 A | 7/1999 | Kawai et al. |
| 5,921,088 A | 7/1999 | Imaizumi et al. |
| 5,955,772 A | 9/1999 | Shakouri et al. |
| 5,959,341 A | 9/1999 | Tsuno et al. |
| 5,964,092 A | 10/1999 | Tozuka et al. |
| 5,966,941 A | 10/1999 | Ghoshal |
| 5,975,856 A | 11/1999 | Welle |
| 5,977,785 A | 11/1999 | Burward-Hoy |
| 5,987,890 A | 11/1999 | Chiu et al. |
| 6,000,225 A | 12/1999 | Ghoshal |
| 6,028,263 A | 2/2000 | Kobayashi et al. |
| 6,050,326 A | 4/2000 | Evans |
| 6,059,198 A | 5/2000 | Moroi et al. |
| 6,082,445 A | 7/2000 | Dugan |
| 6,084,172 A | 7/2000 | Kishi et al. |
| 6,096,966 A | 8/2000 | Nishimoto et al. |
| 6,105,659 A | 8/2000 | Pocol et al. |
| 6,119,463 A | 9/2000 | Bell |
| 6,122,588 A | 9/2000 | Shehan et al. |
| 6,127,766 A | 10/2000 | Roidt |
| 6,138,749 A | 10/2000 | Kawai et al. |
| 6,158,225 A | 12/2000 | Muto et al. |
| 6,203,939 B1 | 3/2001 | Wilson |
| 6,205,802 B1 | 3/2001 | Drucker et al. |
| 6,205,805 B1 | 3/2001 | Takahashi et al. |
| 6,213,198 B1 | 4/2001 | Shikata et al. |
| 6,223,539 B1 | 5/2001 | Bell |
| 6,230,496 B1 | 5/2001 | Hofmann et al. |
| 6,270,015 B1 | 8/2001 | Hirota |
| 6,282,907 B1 | 9/2001 | Ghoshal |
| 6,293,107 B1 | 9/2001 | Kitagawa |
| 6,302,196 B1 | 10/2001 | Haussmann |

(56) References Cited

U.S. PATENT DOCUMENTS

| | | | |
|---|---|---|---|
| 6,320,280 B1 | 11/2001 | Kanesaka |
| 6,324,860 B1 | 12/2001 | Maeda et al. |
| 6,334,311 B1 | 1/2002 | Kim et al. |
| 6,346,668 B1 | 2/2002 | McGrew |
| 6,347,521 B1 | 2/2002 | Kadotani et al. |
| 6,357,518 B1 | 3/2002 | Sugimoto et al. |
| 6,366,832 B2 | 4/2002 | Lomonaco et al. |
| 6,385,976 B1 | 5/2002 | Yamamura et al. |
| 6,393,842 B2 | 5/2002 | Kim |
| 6,401,462 B1 | 6/2002 | Bielinski |
| 6,407,435 B1 | 6/2002 | Ma et al. |
| 6,412,287 B1 | 7/2002 | Hughes et al. |
| 6,438,964 B1 | 8/2002 | Giblin |
| 6,446,442 B1 | 9/2002 | Batchelor et al. |
| 6,457,324 B2 | 10/2002 | Zeigler et al. |
| 6,464,027 B1 | 10/2002 | Dage et al. |
| 6,474,073 B1 | 11/2002 | Uetsuji et al. |
| 6,474,081 B1 | 11/2002 | Feuerecker |
| 6,477,844 B2 | 11/2002 | Ohkubo et al. |
| 6,481,213 B2 | 11/2002 | Carr et al. |
| 6,499,306 B2 | 12/2002 | Gillen |
| 6,510,696 B2 | 1/2003 | Guttman et al. |
| 6,530,231 B1 | 3/2003 | Nagy et al. |
| 6,530,920 B1 | 3/2003 | Whitcroft et al. |
| 6,539,725 B2 | 4/2003 | Bell |
| 6,539,729 B2 | 4/2003 | Tupis et al. |
| 6,541,139 B2 | 4/2003 | Cibuzar |
| 6,548,750 B1 | 4/2003 | Picone |
| 6,554,088 B2 | 4/2003 | Severinsky et al. |
| 6,560,968 B2 | 5/2003 | Ko |
| 6,563,039 B2 | 5/2003 | Caillat et al. |
| 6,569,550 B2 | 5/2003 | Khelifa |
| RE38,128 E | 6/2003 | Gallup et al. |
| 6,580,025 B2 | 6/2003 | Guy |
| 6,598,403 B1 | 7/2003 | Ghoshal |
| 6,598,405 B2 | 7/2003 | Bell |
| 6,605,773 B2 | 8/2003 | Kok |
| 6,606,866 B2 | 8/2003 | Bell |
| 6,606,877 B2 | 8/2003 | Tomita et al. |
| 6,611,115 B2 | 8/2003 | Wakashiro et al. |
| 6,625,990 B2 | 9/2003 | Bell |
| 6,637,210 B2 | 10/2003 | Bell |
| 6,640,889 B1 * | 11/2003 | Harte et al. ............. 165/202 |
| 6,653,002 B1 | 11/2003 | Parise |
| 6,672,076 B2 | 1/2004 | Bell |
| 6,682,844 B2 | 1/2004 | Gene |
| 6,705,089 B2 | 3/2004 | Chu et al. |
| 6,722,139 B2 | 4/2004 | Moon et al. |
| 6,732,534 B2 | 5/2004 | Spry |
| 6,779,348 B2 | 8/2004 | Taban |
| 6,792,259 B1 | 9/2004 | Parise |
| 6,796,399 B2 | 9/2004 | Satou et al. |
| 6,803,766 B2 | 10/2004 | Kobayashi et al. |
| 6,807,811 B2 | 10/2004 | Lee |
| 6,810,977 B2 | 11/2004 | Suzuki |
| 6,812,395 B2 | 11/2004 | Bell |
| 6,862,892 B1 | 3/2005 | Meyer et al. |
| 6,880,346 B1 | 4/2005 | Tseng et al. |
| 6,883,602 B2 * | 4/2005 | Drucker ............. 165/202 |
| 6,886,356 B2 | 5/2005 | Kubo et al. |
| 6,894,369 B2 | 5/2005 | Irino et al. |
| 6,896,047 B2 | 5/2005 | Currle et al. |
| 6,907,739 B2 | 6/2005 | Bell |
| 6,942,728 B2 | 9/2005 | Caillat et al. |
| 6,948,321 B2 | 9/2005 | Bell |
| 6,959,555 B2 | 11/2005 | Bell |
| 6,973,799 B2 | 12/2005 | Kuehl et al. |
| 6,975,060 B2 | 12/2005 | Styblo et al. |
| 6,986,247 B1 | 1/2006 | Parise |
| 7,007,491 B2 | 3/2006 | Grimm et al. |
| 7,089,756 B2 | 8/2006 | Hu |
| 7,100,369 B2 | 9/2006 | Yamaguchi et al. |
| 7,111,465 B2 | 9/2006 | Bell |
| 7,134,288 B2 | 11/2006 | Crippen et al. |
| 7,231,772 B2 | 6/2007 | Bell |
| 7,235,735 B2 | 6/2007 | Venkatasubramanian et al. |
| 7,246,496 B2 | 7/2007 | Goenka et al. |
| 7,310,953 B2 | 12/2007 | Pham et al. |
| 7,363,766 B2 | 4/2008 | Eisenhour |
| 7,380,586 B2 | 6/2008 | Gawthrop |
| 7,421,845 B2 | 9/2008 | Bell |
| 7,426,835 B2 | 9/2008 | Bell |
| 7,587,902 B2 | 9/2009 | Bell |
| 7,784,289 B2 | 8/2010 | Scherer et al. |
| 7,870,745 B2 | 1/2011 | Goenka |
| 7,926,293 B2 | 4/2011 | Bell |
| 7,932,460 B2 | 4/2011 | Bell |
| 8,104,294 B2 | 1/2012 | Reeve |
| 8,359,871 B2 | 1/2013 | Woods et al. |
| 8,408,012 B2 | 4/2013 | Goenka et al. |
| 2001/0029974 A1 | 10/2001 | Cohen et al. |
| 2003/0084935 A1 | 5/2003 | Bell |
| 2003/0094265 A1 | 5/2003 | Chu et al. |
| 2003/0106677 A1 | 6/2003 | Memory et al. |
| 2003/0140636 A1 | 7/2003 | Van Winkle |
| 2003/0217738 A1 | 11/2003 | Ryon |
| 2004/0025516 A1 | 2/2004 | Van Winkle |
| 2004/0045594 A1 | 3/2004 | Hightower |
| 2004/0050076 A1 | 3/2004 | Palfy et al. |
| 2004/0076214 A1 | 4/2004 | Bell et al. |
| 2004/0089336 A1 | 5/2004 | Hunt |
| 2004/0093889 A1 | 5/2004 | Bureau et al. |
| 2004/0098991 A1 | 5/2004 | Heyes |
| 2004/0177876 A1 | 9/2004 | Hightower |
| 2004/0237541 A1 | 12/2004 | Murphy |
| 2004/0261829 A1 | 12/2004 | Bell |
| 2004/0267408 A1 | 12/2004 | Kramer |
| 2005/0000473 A1 | 1/2005 | Ap et al. |
| 2005/0011199 A1 | 1/2005 | Grisham et al. |
| 2005/0061497 A1 | 3/2005 | Amaral |
| 2005/0067862 A1 | 3/2005 | Iqbal et al. |
| 2005/0074646 A1 | 4/2005 | Rajashekara et al. |
| 2005/0081834 A1 | 4/2005 | Perkins |
| 2005/0121065 A1 | 6/2005 | Otey |
| 2005/0139692 A1 | 6/2005 | Yamamoto |
| 2005/0178128 A1 | 8/2005 | Harwood et al. |
| 2005/0247336 A1 | 11/2005 | Inaoka |
| 2005/0257531 A1 | 11/2005 | Kadle et al. |
| 2005/0263176 A1 | 12/2005 | Yamaguchi et al. |
| 2005/0268621 A1 | 12/2005 | Kadle et al. |
| 2005/0278863 A1 | 12/2005 | Bahash et al. |
| 2005/0279105 A1 | 12/2005 | Pastorino |
| 2006/0005548 A1 | 1/2006 | Ruckstuhl |
| 2006/0011152 A1 | 1/2006 | Hayes |
| 2006/0075758 A1 | 4/2006 | Rice et al. |
| 2006/0080979 A1 | 4/2006 | Kitanovski et al. |
| 2006/0086118 A1 | 4/2006 | Venkatasubramanian et al. |
| 2006/0124165 A1 | 6/2006 | Bierschenk et al. |
| 2006/0130490 A1 | 6/2006 | Petrovski |
| 2006/0150657 A1 | 7/2006 | Spurgeon et al. |
| 2006/0168969 A1 | 8/2006 | Mei et al. |
| 2006/0174633 A1 | 8/2006 | Beckley |
| 2006/0188418 A1 | 8/2006 | Parks et al. |
| 2006/0219281 A1 | 10/2006 | Kuroyanagi et al. |
| 2006/0225441 A1 | 10/2006 | Goenka et al. |
| 2006/0254284 A1 | 11/2006 | Ito et al. |
| 2006/0254285 A1 | 11/2006 | Lin |
| 2007/0000255 A1 | 1/2007 | Elliot et al. |
| 2007/0017666 A1 | 1/2007 | Goenka et al. |
| 2007/0056295 A1 | 3/2007 | De Vilbiss |
| 2007/0125413 A1 | 6/2007 | Olsen et al. |
| 2007/0214799 A1 | 9/2007 | Goenka |
| 2007/0220902 A1 | 9/2007 | Matsuoka et al. |
| 2007/0272290 A1 | 11/2007 | Sims et al. |
| 2008/0017362 A1 | 1/2008 | Kwon et al. |
| 2008/0028768 A1 * | 2/2008 | Goenka ............. 62/3.2 |
| 2008/0028769 A1 | 2/2008 | Goenka |
| 2008/0115818 A1 | 5/2008 | Cheng et al. |
| 2008/0173342 A1 | 7/2008 | Bell |
| 2008/0230618 A1 | 9/2008 | Gawthrop |
| 2008/0245398 A1 | 10/2008 | Bell |
| 2008/0250794 A1 | 10/2008 | Bell |
| 2008/0289677 A1 | 11/2008 | Bell |
| 2008/0307796 A1 | 12/2008 | Bell et al. |

(56) References Cited

U.S. PATENT DOCUMENTS

| | | |
|---|---|---|
| 2009/0000310 A1 | 1/2009 | Bell et al. |
| 2009/0007572 A1 | 1/2009 | Bell et al. |
| 2009/0007952 A1 | 1/2009 | Kondoh et al. |
| 2009/0133734 A1 | 5/2009 | Takahashi et al. |
| 2009/0293499 A1 | 12/2009 | Bell et al. |
| 2009/0301103 A1 | 12/2009 | Bell et al. |
| 2010/0031987 A1 | 2/2010 | Bell |
| 2010/0031988 A1 | 2/2010 | Bell |
| 2010/0052374 A1 | 3/2010 | Bell et al. |
| 2010/0101239 A1 | 4/2010 | LaGrandeur et al. |
| 2010/0112419 A1 | 5/2010 | Jang et al. |
| 2010/0155018 A1 | 6/2010 | Goenka et al. |
| 2010/0287952 A1 | 11/2010 | Goenka |
| 2010/0291414 A1 | 11/2010 | Bell et al. |
| 2010/0313576 A1 | 12/2010 | Goenka |
| 2010/0326092 A1 | 12/2010 | Goenka |
| 2010/0331657 A1 | 12/2010 | Mensinger et al. |
| 2011/0067742 A1 | 3/2011 | Bell et al. |
| 2011/0079023 A1 | 4/2011 | Goenka et al. |
| 2011/0107772 A1 | 5/2011 | Goenka |
| 2011/0107773 A1 | 5/2011 | Gawthrop |
| 2011/0162389 A1 | 7/2011 | Bell |
| 2011/0209740 A1 | 9/2011 | Bell et al. |
| 2011/0236731 A1 | 9/2011 | Bell et al. |
| 2011/0247668 A1 | 10/2011 | Bell et al. |
| 2011/0258995 A1 | 10/2011 | Limbeck et al. |
| 2012/0102934 A1 | 5/2012 | Magnetto |
| 2012/0111386 A1 | 5/2012 | Bell et al. |
| 2012/0174567 A1 | 7/2012 | Limbeck et al. |
| 2012/0177864 A1 | 7/2012 | Limbeck et al. |
| 2012/0266608 A1 | 10/2012 | Kadle et al. |
| 2013/0037073 A1 | 2/2013 | LaGrandeur |
| 2013/0068273 A1 | 3/2013 | Kanno et al. |
| 2013/0104953 A1 | 5/2013 | Poliquin et al. |
| 2013/0167894 A1 | 7/2013 | Brueck et al. |

FOREIGN PATENT DOCUMENTS

| | | |
|---|---|---|
| CN | 1295345 | 5/2001 |
| DE | 13 01 454 | 8/1969 |
| DE | 2319155 | 10/1974 |
| DE | 197 30 678 | 1/1999 |
| DE | 198 29 440 | 1/2000 |
| DE | 199 51 224 | 5/2001 |
| DE | 20 105 487 | 10/2001 |
| DE | 10 2010 012 629 | 9/2011 |
| EP | 0 389 407 | 9/1990 |
| EP | 0418995 B1 | 3/1991 |
| EP | 0 545 021 | 6/1993 |
| EP | 0 791 497 | 8/1997 |
| EP | 1 174 996 A1 | 1/2002 |
| EP | 1 324 400 A | 7/2003 |
| EP | 1 475 532 A | 11/2004 |
| EP | 1 515 376 | 3/2005 |
| EP | 1641067 A1 | 3/2006 |
| EP | 1 932 695 A1 | 6/2008 |
| EP | 2 541 634 | 1/2013 |
| EP | 1 780 807 | 2/2013 |
| FR | 1 280 711 A | 1/1962 |
| FR | 2 419 479 A | 10/1979 |
| FR | 2543275 | 9/1984 |
| FR | 2 550 324 A | 2/1985 |
| FR | 2806666 | 9/2001 |
| FR | 2 879 728 | 6/2006 |
| GB | 231 192 A | 5/1926 |
| GB | 817 077 | 7/1959 |
| GB | 952 678 | 3/1964 |
| GB | 1 040 485 | 8/1966 |
| GB | 1151947 | 5/1969 |
| GB | 2 027 534 | 2/1980 |
| GB | 2 267 338 | 12/1993 |
| GB | 2 333 352 | 7/1999 |
| JP | 39-27735 | 12/1964 |
| JP | 56-18231 | 2/1981 |
| JP | 59097457 | 6/1984 |
| JP | 60-80044 | 7/1985 |
| JP | 63-262076 A | 10/1988 |
| JP | 01 131830 A | 5/1989 |
| JP | 01 200122 | 8/1989 |
| JP | 01 281344 | 11/1989 |
| JP | 03-263382 | 11/1991 |
| JP | 04 103925 | 4/1992 |
| JP | 4-165234 | 6/1992 |
| JP | 04-165234 | 6/1992 |
| JP | 6-024235 | 2/1994 |
| JP | 06-089955 | 3/1994 |
| JP | 6342940 | 12/1994 |
| JP | 7-198284 | 1/1995 |
| JP | A-7-7187 | 1/1995 |
| JP | 07-074397 | 3/1995 |
| JP | 09-321355 | 5/1995 |
| JP | 07-54189 | 6/1995 |
| JP | 7 156645 | 6/1995 |
| JP | A-7-202275 | 8/1995 |
| JP | 07-253224 | 10/1995 |
| JP | 2006 015965 | 1/1996 |
| JP | 07-253264 | 2/1996 |
| JP | 08-222771 | 8/1996 |
| JP | 08-316388 | 11/1996 |
| JP | A-8-293627 | 11/1996 |
| JP | 09042801 | 2/1997 |
| JP | 9-089284 A | 4/1997 |
| JP | 09-254630 | 9/1997 |
| JP | 9276076 | 10/1997 |
| JP | 10012935 | 1/1998 |
| JP | 10-035268 | 2/1998 |
| JP | 10035268 | 2/1998 |
| JP | H10-325561 | 8/1998 |
| JP | 10238406 A | 9/1998 |
| JP | 10-275943 | 10/1998 |
| JP | 10290590 | 10/1998 |
| JP | 11-317481 | 11/1998 |
| JP | 11046021 | 2/1999 |
| JP | 11-182907 | 7/1999 |
| JP | 11-201475 A | 7/1999 |
| JP | 11-274574 | 10/1999 |
| JP | 11-342731 | 12/1999 |
| JP | 2000 018095 | 1/2000 |
| JP | H2000-58930 | 2/2000 |
| JP | 2000 130883 A1 | 5/2000 |
| JP | 2000-161721 | 6/2000 |
| JP | 2000-274788 | 6/2000 |
| JP | 00 208823 | 7/2000 |
| JP | H2000-214934 | 8/2000 |
| JP | 2000-274788 | 10/2000 |
| JP | 2000-274874 | 10/2000 |
| JP | 2000-318434 | 11/2000 |
| JP | 2001-24240 | 1/2001 |
| JP | 2001-210879 | 8/2001 |
| JP | 2001-267642 A | 9/2001 |
| JP | 2001304778 | 10/2001 |
| JP | 2001-336853 | 1/2002 |
| JP | 2002-13758 | 1/2002 |
| JP | 2002059736 A | 2/2002 |
| JP | 2002 232028 A | 8/2002 |
| JP | 2003175720 A | 6/2003 |
| JP | 2003 259671 | 9/2003 |
| JP | 2003332642 | 11/2003 |
| JP | 2004 050874 | 2/2004 |
| JP | 2004079883 | 3/2004 |
| JP | 2004-360522 | 12/2004 |
| JP | 2005-212564 | 11/2005 |
| JP | 2005 317648 | 11/2005 |
| JP | 2008 274790 | 11/2008 |
| JP | 2008300465 | 12/2008 |
| JP | 2009 033806 | 2/2009 |
| KR | 2001 111646 | 12/2001 |
| LU | 66619 | 2/1973 |
| RU | 2142178 | 11/1999 |
| RU | 2 154 875 C2 | 8/2000 |
| SE | 337 227 | 5/1971 |
| SU | 184886 A | 7/1966 |
| SU | 1142711 A | 2/1985 |

(56) References Cited

FOREIGN PATENT DOCUMENTS

| WO | WO 95/01500 | 1/1995 |
|---|---|---|
| WO | WO 96/05475 | 2/1996 |
| WO | WO 9722486 A1 | 6/1997 |
| WO | WO 97/47930 | 12/1997 |
| WO | WO 9856047 A1 | 12/1998 |
| WO | WO 99/10191 | 3/1999 |
| WO | WO 99/58907 | 11/1999 |
| WO | WO 02/00458 | 1/2002 |
| WO | WO 02081982 A1 | 10/2002 |
| WO | WO 03/014634 | 2/2003 |
| WO | WO 03/074951 A1 | 9/2003 |
| WO | WO 03/090286 A | 10/2003 |
| WO | WO 03/104726 A1 | 12/2003 |
| WO | WO 2004/019379 A | 3/2004 |
| WO | WO 2005/023571 | 3/2005 |
| WO | WO 2005/020340 A | 5/2005 |
| WO | WO 2005/098225 A | 10/2005 |
| WO | WO 2006/037178 A | 4/2006 |
| WO | WO 2006/043514 A | 4/2006 |
| WO | WO 2006/001827 | 5/2006 |
| WO | WO 2006/064432 | 6/2006 |
| WO | WO2006/064432 | 6/2006 |
| WO | WO 2007/001289 | 1/2007 |
| WO | WO 2007/109368 | 9/2007 |
| WO | WO 2008/013946 A2 | 1/2008 |
| WO | WO 2008/042077 | 4/2008 |
| WO | WO 2008/147305 A1 | 4/2008 |
| WO | WO 2008/091293 A2 | 7/2008 |
| WO | WO 2008/123663 | 10/2008 |
| WO | WO 2008/148042 | 12/2008 |
| WO | WO 2010/048575 | 4/2010 |
| WO | WO 2012/031980 | 3/2012 |
| WO | WO 2012/045542 | 4/2012 |

OTHER PUBLICATIONS

Diller, R. W., et al.: "Experimental results confirming improved performance of systems using thermal isolation" Thermoelectrics, 2002. Proceedings ICT '02. Twenty-First International Conference on Aug. 25-29, 2002, Piscataway, NJ USA, IEEE, Aug. 25, 2002, pp. 548-550, XP010637541 ISBN: 0-7803-7683-8.

Diller, R.W., et al., "Experimental Results Confirming Improved Efficiency of Thermoelectric Power Generation Systems with Alternate Thermodynamic Cycles," 22nd International Conference on Thermoelectrics, 2003, pp. 571-573.

Hendricks, Terry et al., "Advanced Thermoelectric Power System Investigations for Light-Duty and Heavy Duty Applications," National Renewable Energy Laboratory, Center for Transportation Technology & Systems, Colorado, 2002.

Menchen, William R., et al., "Thermoelectric Conversion to Recover Heavy Duty Diesel Exhaust Energy," Teledyne Energy Systems, Timonium, MD 1990.

Miner, A., et al. "Thermo-Electro-Mechanical Refrigeration Based on Transient Thermoelectric Effects", Applied Physics letters, vol. 75, pp. 1176-1178 (1999).

Notice of Allowance mailed Oct. 20, 2010, U.S. Appl. No. 12/131,853.

Request for Amendment under 17 C.F.R. § 1.312 and Comments on Examiner's Statement of Reasons for Allowance dated Dec. 7, 2010, U.S. Appl. No. 12/131,853.

Snyder, G. Jeffrey, et al., "Thermoelectric Effciency and Compatibility," The American Physical Society, Oct. 2, 2003, vol. 91, No. 14.

Tada, S., et al., "A New Concept of Porous Thermoelectric Module Using a Reciprocating Flow for Cooling/Heating Systems (Numerical Analysis for Heating Systems)" 16th International Conference on Thermoelectrics (1977).

Derwent-Acc-No. 1998-283540, Kwon, H et al., Hyundai Motor Co., corresponding to KR 97026106 A, published Jun. 24, 1997 (2 pages).

Lofy, John et al., "Thermoelectrics for Environmental Control Automobiles," 21st International Conference on Thermoelectronics, 2002, p. 471-476.

Funahashi et al., "Preparation and properties of thermoelectric pipe-type modules", ICT 25th International Conference on Aug. 6-10, 2006, Thermoelectrics, 2006, pp. 58-61.

Min et al., "Ring-structured thermoelectric module", Semiconductor Science and Technology, Aug. 2007, vol. 22, No. 8, pp. 880-888.

Thermoelectrics Handbook: Macro to Nano, 2006, Chpt. 11, Section 11.7, pp. 11-11 to 11-15, CRC Press, Boca Raton, FL.

* cited by examiner

| MODE | WORKING FLUID | | | | ELECTRIC POWER | | | | COMFORT AIR |
|---|---|---|---|---|---|---|---|---|---|
| | F1 | F2 | F3 | F4 | E1 | E2 | E3 | E4 | F5 |
| HEAT/DEMIST | AUX RAD | ← | PWR TRAIN COOL | ← | COOLING POLARITY | | HEATING POLARITY | | WARMING DRYING |
| HEATING | PWR TRAIN COOL | ← | ← | ← | BOTH CIRCUITS IN HEAT MODE POLARITY | | | | WARMING |
| COOLING | AUX RAD | ← | ← | ← | BOTH CIRCUITS IN COOLING MODE POLARITY | | | | COOLING |

| MODE | POWER CONFIG | | | |
|---|---|---|---|---|
| | E1 | E2 | E3 | E4 |
| DEMIST/HEAT | −VAC | RTN | +VAC | RTN |
| HEAT | +VAC COMMON | RTN | +VAC COMMON E1 | RTN |
| COOL | −VAC COMMON | RTN | −VAC COMMON E1 | RTN |
*FIG. 9*
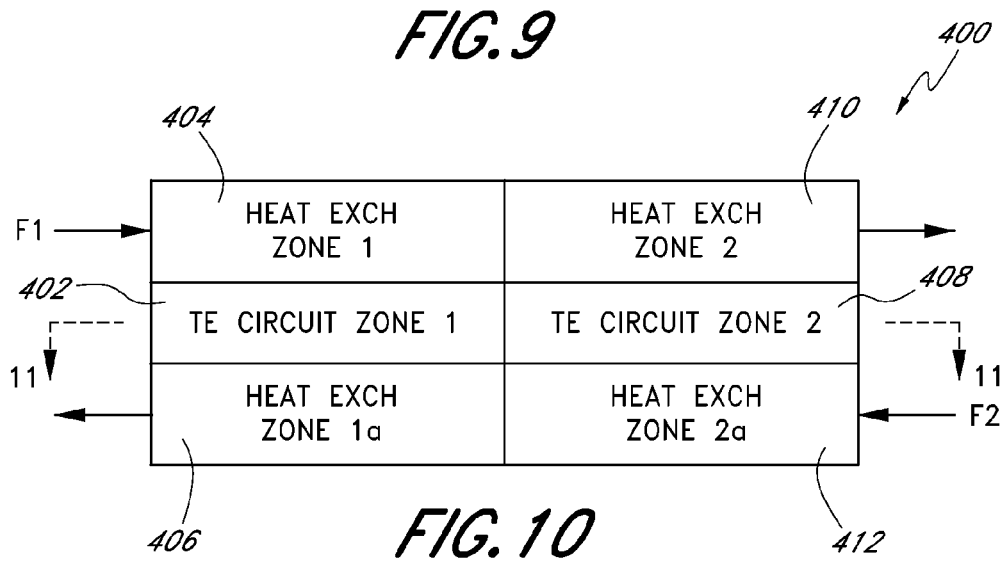
*FIG. 10*
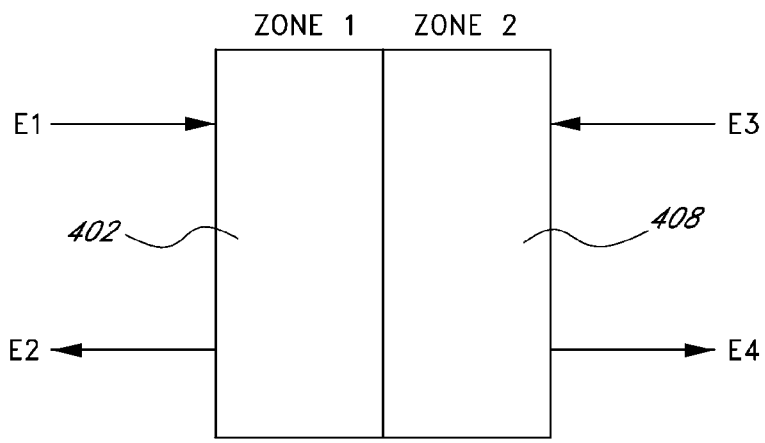
*FIG. 11*

HEATER-COOLER WITH BITHERMAL THERMOELECTRIC DEVICE

CROSS-REFERENCE TO RELATED APPLICATIONS

This application claims the benefit under 35 U.S.C. §119(e) of U.S. Provisional Patent Application No. 61/108,004, titled HEATER-COOLER WITH BITHERMAL THERMO-ELECTRIC DEVICE, filed Oct. 23, 2008, the entire contents of which are incorporated by reference herein and made a part of this specification.

BACKGROUND

1. Field

This disclosure relates to the field of heating and cooling systems and, more particularly, to cooling and heating systems incorporating a thermoelectric device.

2. Description of Related Art

A passenger compartment of a vehicle is typically heated and cooled by a heating, ventilating, and air conditioning (HVAC) system. The HVAC system directs a flow of air through a heat exchanger to heat or cool the air prior to flowing into the passenger compartment. In the heat exchanger, energy is transferred between the air and a coolant such as a water-glycol coolant, for example. The air is normally supplied from ambient air or a mixture of air re-circulated from the passenger compartment and ambient air. Energy for heating and cooling of the passenger compartment of the vehicle is typically supplied from a fuel fed engine such as an internal combustion engine, for example.

Some automotive HVAC architectures include a thermoelectric device that provides supplemental heating and/or cooling of air flowing to the passenger compartment. Existing automotive thermoelectric device HVAC architectures suffer from various drawbacks.

SUMMARY

Embodiments described herein have several features, no single one of which is solely responsible for their desirable attributes. Without limiting the scope of the invention as expressed by the claims, some of the advantageous features will now be discussed briefly.

Disclosed embodiments include systems for heating and cooling the interior climate of a vehicle. In some embodiments, a system for controlling temperature in a passenger compartment of a vehicle includes a main fluid channel and one or more thermoelectric devices operatively connected to the main fluid channel. The thermoelectric devices can include at least one thermoelectric element configured to heat a fluid flowing in the main fluid channel upon application of electrical energy in a first polarity and to cool the fluid upon application of electrical energy in a second polarity. The thermoelectric devices can be subdivided into a plurality of thermal zones. The plurality of thermal zones can include a first thermal zone connected to a first electric circuit switchable between the first polarity and the second polarity and a second thermal zone connected to a second electric circuit switchable between the first polarity and the second polarity independent of the polarity of the first electric circuit.

The system can include a first heat exchanger disposed in the main fluid channel and thermally connected to one or more thermoelectric devices. As an example, the main fluid channel can be connected to a single thermoelectric device in which a first main surface in the first thermal zone of the thermoelectric device and a second heat exchanger disposed in the main fluid channel and thermally connected to a second main surface in the second thermal zone of the thermoelectric device. The system can include a working fluid channel; a third heat exchanger disposed in the working fluid channel and thermally connected to a first waste surface in the first thermal zone of the thermoelectric device; and a fourth heat exchanger disposed in the working fluid channel and thermally connected to a second waste surface in the second thermal zone of the thermoelectric device. The thermoelectric device can be configured to transfer thermal energy between the first main surface and the first waste surface in the first thermal zone and to transfer thermal energy between the second main surface and the second waste surface in the second thermal zone.

The system can include a controller configured to operate the system in one of a plurality of available modes by controlling the polarity of the first electric circuit and the polarity of the second electric circuit. The plurality of available modes can include a demisting mode, a heating mode, and a cooling mode. The controller can be configured to operate the first electric circuit in the second polarity and the second electric circuit in the first polarity of one or more thermoelectric devices independently when at least one thermoelectric device is operating in the demisting mode.

The system can include a first working fluid circuit thermally connected to a first waste surface in the first thermal zone of one or more of the thermoelectric devices and a second working fluid circuit independent from the first working fluid circuit, the second working fluid circuit thermally connected to a second waste surface in the second thermal zone of one or more of the thermoelectric devices. Each of the first working fluid circuit and the second working fluid circuit can be selectively connected between either one or more thermoelectric devices and a heat sink or one or more thermoelectric devices and a heat source. The first working fluid circuit can be connected to a heat source when the first electric circuit is switched to the first polarity and can be connected to a heat sink when the first electric circuit is switched to the second polarity. The second working fluid circuit can be connected to the heat source when the second electric circuit is switched to the first polarity and can be connected to a heat sink when the second electric circuit is switched to the second polarity. The system can include a controller configured to operate the system in a demisting mode by switching the first electric circuit to the second polarity and switching the second electric circuit to the first polarity.

In certain embodiments, a method of delivering temperature controlled air to a passenger compartment of a vehicle using an HVAC system includes operating the system in one of a plurality of available modes to provide an airflow to the passenger compartment. The plurality of available modes can include a demisting mode, a heating mode, and a cooling mode separately operable in one or more zones within the vehicle. The method can include delivering air to at least a portion of the passenger compartment during the demisting mode of operation by directing an airflow into a main fluid channel; cooling the airflow in the main fluid channel by removing thermal energy from the airflow in a first thermal zone of a thermoelectric device; and subsequently heating the airflow by adding thermal energy to the airflow in a second thermal zone of the thermoelectric device. The method can include delivering a heated airflow to at least a portion of the passenger compartment during the heating mode of operation by directing an airflow into a main fluid channel; and heating the airflow in the main fluid channel by adding thermal energy to the airflow in the first thermal zone and in the second thermal zone of the thermoelectric device. The method can include delivering a cooled airflow to at least a portion of the passenger compartment during the cooling mode of operation by directing an airflow into a main fluid channel and cooling the airflow in the main fluid channel by removing thermal energy from the airflow in the first thermal zone and in the second thermal zone of the thermoelectric device.

Delivering air can include removing thermal energy from the first thermal zone of at least one of the thermoelectric devices by circulating a first working fluid between the first thermal zone and a heat sink and adding thermal energy to the second thermal zone of the thermoelectric device by circulating a second working fluid between the second thermal zone and a heat source. Each of the first working fluid and the second working fluid can comprise a liquid heat transfer fluid. For example, the first working fluid can comprise an aqueous solution, and the second working fluid can comprise the same aqueous solution but at a different temperature.

Delivering a heated airflow further can include providing electrical energy having a first polarity to the first thermal zone of a thermoelectric device and providing electrical energy having the same polarity to the second thermal zone of the thermoelectric device. The electrical energy provided to the thermoelectric device can cause thermal energy to be transferred from at least one working fluid to the airflow via the thermoelectric device.

In some embodiments, a method of manufacturing a system for conditioning passenger air in a vehicle includes providing an air flow channel; operatively connecting one or more a thermoelectric devices to the air flow channel; providing at least one working fluid channel in thermal communication with at least one waste surface of one or more thermoelectric devices; and connecting a first electric circuit to a first thermal zone of the thermoelectric devices. The first electric circuit can be configured to selectively supply electrical power to the first thermal zone in a first polarity or in a second polarity. The method can include connecting a second electric circuit to a second thermal zone of a thermoelectric device. The second electric circuit can be configured to selectively supply electrical power to the second thermal zone in the first polarity or in the second polarity.

The method can include providing a controller configured to control the system at least in part by selecting the polarity of the first electric circuit and the polarity of the second electric circuit in one or more thermoelectric devices.

The method can include configuring the at least one working fluid channel to selectively move thermal energy between at least one thermoelectric device and a heat source or a heat sink.

Operatively connecting a thermoelectric device to the air flow channel can include disposing a first heat exchanger in the air flow channel; disposing a second heat exchanger in the air flow channel; connecting the first thermal zone of the thermoelectric device to the first heat exchanger; and connecting the second thermal zone of the thermoelectric device to the second heat exchanger. Connecting the first thermal zone of the thermoelectric device to the first heat exchanger can include connecting a main surface in the first thermal zone to the first heat exchanger, the main surface being opposite a waste surface in the first thermal zone.

In certain embodiments, a system for controlling temperature in at least a portion of the passenger compartment of a vehicle includes a first fluid channel; a second fluid channel at least partially separated from the first fluid channel by a partition; a cooling apparatus operatively connected to cool air in the first fluid channel; a heater core operatively connected to heat air in the second fluid channel; a thermoelectric device operatively connected to the second fluid channel downstream from the heater core; and a flow diversion channel disposed between the first fluid channel and the second fluid channel. The flow diversion channel can be configured to selectively divert air that the cooling apparatus has cooled in the first fluid channel to the second fluid channel such that the air flows past at least one of the heater core and the thermoelectric device after passing through the flow diversion channel. A controller can be configured to operate at least one such system in at least a cooling mode, a heating mode, and a demisting mode. The controller can cause the flow diversion channel to divert air from the first fluid channel to the second fluid channel during the demisting mode.

The flow diversion channel can include a diversion blend door configured to rotate between at least an open position and a closed position. Air can be diverted from the first fluid channel to the second fluid channel when the diversion blend door is in the open position. Air can be permitted to flow without diversion through the first fluid channel when the diversion blend door is in the closed position.

The system can include an inlet channel selection apparatus configured to direct at least a portion of the air entering the system to at least one of the first fluid channel and the second fluid channel. The inlet channel selection apparatus can be configured to direct an airflow into the second fluid channel, and the thermoelectric device can be configured to transfer thermal energy to the airflow, during the heating mode of operation. The inlet channel selection apparatus can include an inlet blend door. The inlet blend door can be operable to move between a first position, a second position, and all positions in between the first and second positions. The position of the inlet blend door can be independent of the position of the diversion blend door.

At least one cooling apparatus can absorb thermal energy from an airflow, and the thermoelectric device can transfer thermal energy to the airflow during the demisting mode of operation. At least one cooling apparatus can be configured to absorb thermal energy from the airflow, and the thermoelectric device can be configured to absorb thermal energy from the airflow during the cooling mode of operation.

The flow diversion channel can include an aperture formed in the partition. The aperture can be configured to be selectively blocked.

One or more thermoelectric devices can be subdivided into a plurality of thermal zones, the plurality of thermal zones including a first thermal zone configured to heat a fluid flowing in the second fluid channel upon application of electrical energy in a first polarity and to cool the fluid upon application of electrical energy in a second polarity and a second thermal zone switchable between the first polarity and the second polarity independent of the polarity of the electrical energy applied to the first thermal zone.

One or more heater cores can be in thermal communication with power train coolant during at least the heating mode. In some embodiments, heater cores are not in thermal communication with power train coolant during at least the cooling mode.

At least one surface of one or more thermoelectric devices can be connected to a heat exchanger in thermal communication with the airflow. The cooling apparatus can also be connected to one or more heat exchangers in thermal communication with the airflow.

In certain embodiments, a method of delivering temperature controlled air to a passenger compartment of a vehicle using an HVAC system includes operating at least a portion of the system in one of a plurality of available modes to provide an airflow to at least a portion of the passenger compartment.

The plurality of available modes can include demisting modes, heating modes, and cooling modes. The method can include delivering air to the passenger compartment during the demisting mode of operation by directing the airflow into at least a first fluid flow channel; cooling the airflow in the first fluid flow channel with a cooling apparatus; subsequently diverting the airflow from the first fluid flow channel to a second fluid flow channel; and subsequently heating the airflow in the second fluid flow channel with a heater core, with a thermoelectric device, or with both the heater core and the thermoelectric device. The method can include delivering a heated airflow to at least a portion of the passenger compartment during the heating mode of operation by directing the airflow into at least the second fluid flow channel; and heating the airflow in the second fluid flow channel with a heater core, with a thermoelectric device, or with both the heater core and the thermoelectric device. The method can include delivering a cooled airflow to at least a portion of the passenger compartment during the cooling mode of operation by directing the airflow into at least one of the first fluid flow channel and the second fluid flow channel and cooling the airflow by cooling the airflow in the first fluid flow channel with the cooling apparatus, cooling the airflow in the second fluid flow channel with the thermoelectric device, or cooling the airflow in the first fluid flow channel with the cooling apparatus while cooling the airflow in the second fluid flow channel with the thermoelectric device.

Delivering the air during the cooling mode can include determining whether a first amount of energy to be provided to the thermoelectric device to cool the airflow to a desired temperature using the thermoelectric device is less than a second amount of energy to be provided to the cooling apparatus to cool the airflow to the desired temperature using the cooling apparatus and cooling the airflow in the second fluid flow channel with the thermoelectric device when it is determined that the first amount of energy is less than the second amount of energy.

Delivering a heated airflow can include determining whether the heater core is able to heat the airflow to a desired temperature; heating the airflow in the second fluid flow channel with the heater core when it is determined that the heater core is able to heat the airflow to the desired temperature; and heating the airflow in the second fluid flow channel with a thermoelectric device when it is determined that the heater core is not able to heat the airflow to the desired temperature.

In some embodiments, a method of manufacturing an apparatus for conditioning passenger air in at least a portion of a vehicle includes providing an air flow channel divided at least partially into a first air conduit and a second air conduit; operatively connecting a cooling apparatus to the first air conduit; operatively connecting a heater core to the second air conduit; operatively connecting at least one thermoelectric device to the second air conduit such that the thermoelectric device is downstream from the heater core when air flows through the channel; and providing a fluid diversion channel between the first air conduit and the second air conduit such that the fluid diversion channel is positioned downstream from the cooling apparatus and upstream from the heater core when air flows through the channel. The fluid diversion channel can be configured to selectively divert air from the first air conduit to the second air conduit.

Operatively connecting a cooling apparatus can include disposing a heat exchanger in the first fluid channel and connecting the heat exchanger to the cooling apparatus. Operatively connecting a heater core can include disposing a heat exchanger in the second fluid channel and connecting the heat exchanger to the heater core. Operatively connecting a thermoelectric device can include disposing a heat exchanger in the second fluid channel and connecting the heat exchanger to the thermoelectric device.

The method can include providing a channel selection apparatus, wherein the channel selection apparatus is disposed near the inlet of the first air conduit and the second air conduit.

BRIEF DESCRIPTION OF THE DRAWINGS

The following drawings and the associated descriptions are provided to illustrate embodiments of the present disclosure and do not limit the scope of the claims.

FIG. 9 is a chart related to the power configuration of an example embodiment of a bithermal thermoelectric device.

FIG. 10 is a schematic illustration of an example embodiment of a temperature control system incorporating a bithermal thermoelectric device.

FIG. 11 is a schematic illustration of an example embodiment of a bithermal thermoelectric circuit.

DETAILED DESCRIPTION

Figure 1:
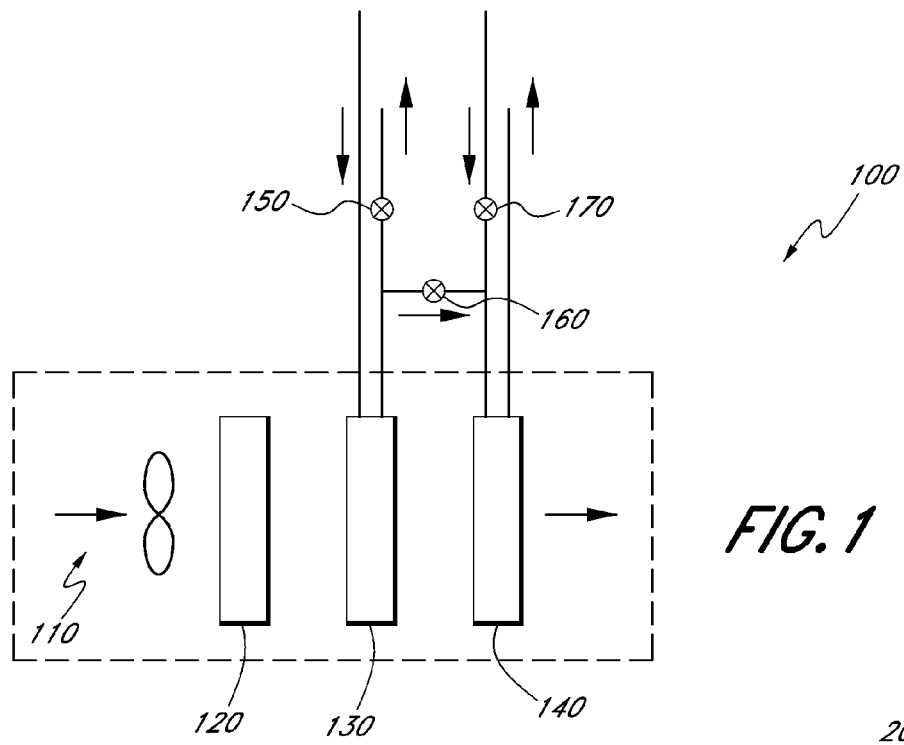
FIG. 1 illustrates a schematic illustration of an example embodiment of an HVAC architecture incorporating a thermoelectric device.

Although certain preferred embodiments and examples are disclosed herein, inventive subject matter extends beyond the specifically disclosed embodiments to other alternative embodiments and/or uses of the inventions, and to modifications and equivalents thereof. Thus, the scope of the inventions herein disclosed is not limited by any of the particular embodiments described below. For example, in any method or process disclosed herein, the acts or operations of the method or process may be performed in any suitable sequence and are not necessarily limited to any particular disclosed sequence.

For purposes of contrasting various embodiments with the prior art, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein. While some of the embodiments are discussed in the context of particular fluid circuit and valve configurations, it is understood that the inventions may be used with other system configurations.

As used herein, the term "coolant" broadly refers to fluids that transfer thermal energy within a heating or cooling system. As used herein, the term "heat transfer device" broadly refers to a heat exchanger, a heat transfer surface, a heat transfer structure, another suitable apparatus for transferring thermal energy between media, or any combination of such devices. As used herein, the terms "thermal energy source" and "heat source" broadly refer to a heater core, a vehicle engine, any suitable device that converts energy into thermal energy, or any combination of such apparatus.

The temperature is within a vehicle passenger compartment are typically controlled using a heating, ventilating, and air conditioning (HVAC) system, which can also be called a comfort air system. When the system is used for heating, a source of heat such as from a vehicle engine can act as a heater core, and thermal energy can be transferred from the heater core to a heat exchanger via a coolant circuit. The heat exchanger can transfer the thermal energy to an airflow that crosses the heat exchanger before entering the passenger compartment. In some configurations, the engine or heater core of a vehicle can take a substantial amount of time, such as several minutes, to reach a temperature at which the heater core is able to sufficiently heat air directed into the vehicle passenger compartment. For example, in certain types of vehicles, such as plug-in hybrids, the engine may not even turn on until the vehicle has been driven a substantial distance, such as 50 miles.

Cooling can be achieved using a compressor-based refrigeration system (including various components, such as an evaporator) to cool the airflow entering the passenger compartment. The vehicle engine can provide energy to power the components of a cooling system (e.g., via a mechanical or electrical linkage). Many components of a cooling system are often separate from the components of a heating system.

Some automotive HVAC systems provide a demisting function, in which humidity is removed from air during a heating mode to remove fogging and/or prevent condensate formation on a windscreen. In some systems, the demisting function is achieved by forcing air first through an evaporator to lower the air temperature below the dew point, thus condensing and removing moisture. The evaporator can, for example, be cooled by a two-phase vapor compression cycle. After passing through the evaporator, the air can be forced through a heater to achieve a suitable temperature for passenger comfort.

Automotive HVAC architectures can include one or more thermoelectric devices (TED) to supplement heating and cooling of a passenger compartment. However, adding thermoelectric devices to a heating and cooling system typically has a large impact on the HVAC system design, and designs can include two or more heat exchangers. Therefore, a need exists for an improved temperature control system that is able to heat and/or cool a passenger compartment quickly and efficiently without requiring additional heat exchangers or large numbers of other components not used in a typical HVAC system design. A system would be advantageous if TEDs could selectively boost heating or cooling power provided by other subsystems, and allow the HVAC system to rely on the evaporator core to dehumidify air when demisting is desired.

System architectures need to be re-evaluated to develop optimum arrangements of subsystems because thermoelectric devices provide dual functionality in a single device. Some system architectures have been developed to optimize TE HVAC systems in order to overcome issues related to placement of TEDs in series with the evaporator and heater cores. In some embodiments, a first and second fluid conduit is utilized in conjunction with a plurality of blend doors in order to optimize the position of the subsystems.

Referring now to FIG. 1, illustrated is an example embodiment of an HVAC system 100 including a heater core 130, an evaporator 120, and a thermoelectric device (TED) 140. At least some of the components of the HVAC system can be in fluid communication via thermal energy transport means such as fluid conducting tubes, for example. Control devices such as valves 150, 160, and 170 can be used to control the thermal energy transfer through the tubing. A controller can be configured to control the various components of the system and their relative fluid communication. In the illustrated embodiment, when valve 160 is open, there is a thermal circuit connecting the heater core 130 and the TED 140. An air handling unit (e.g., a fan) is configured to convey an airflow 110; the airflow is in thermal communication with the evaporator 120, the heater core 130, and the TED 140. The TED 140 can include one or more thermoelectric elements that transfer thermal energy in a particular direction when electrical energy is applied to the one or more TE elements. When electrical energy is applied using a first polarity, the TED 140 transfers thermal energy in a first direction. Alternatively, when electrical energy of a second polarity opposite the first polarity is applied, the TED 140 transfers thermal energy in a second direction opposite the first direction.

In a first mode, which can be called a heating mode, valve 150 is open to allow the heater core 130 to be in thermal communication with a thermal energy source (not shown), such as a vehicle engine, a separate fuel-burning engine, an electrical heat generator, or any other heat source. The evaporator 120 is not in fluid communication with a thermal energy sink in order to minimize the thermal energy transferred between the airflow and the evaporator 120. Thermal energy from the heater core 130 is transferred to the airflow 110. In order to provide supplemental heating to the airflow, valve 160 may be opened, which opens the thermal circuit between the TED 140 and the heater core 130, in which case the TED 140 is in thermal communication with the thermal energy source. Electric energy is applied to the TED 140 in a polarity that transfers thermal energy to the airflow 110.

In a second mode, which can be called a cooling mode, valves 150 and 160 are closed, and valve 170 is open. Accordingly, fluid flow between heater core 130 and the thermal energy source is stopped in order to minimize thermal energy transferred from the heater core 130 to the airflow 110. The evaporator 120 is in fluid communication with a thermal energy sink (not shown), such as a compressor-based refrigeration system, causing a fluid, such as coolant to flow through the evaporator 120. The evaporator 120 transfers thermal energy away from the airflow 110. The TED 140 is now in fluid communication with a thermal energy sink via the valve 170, such as an auxiliary radiator or cooling system, and can be used to transfer additional thermal energy away from the airflow 110. The polarity of the TED is opposite the polarity that was used in the first mode.

In a third mode, which can be called a demisting mode, valve 150 is open and valve 170 is closed. The heater core 130 is in thermal communication with the thermal energy source. The evaporator 120 is in thermal communication with the thermal heat sink. In order to provide supplemental heating to the airflow 110, valve 160 may be opened so that the TED 140 is in thermal communication with the thermal energy source, in which case the TED 140 transfers thermal energy from the thermal energy source into the airflow 110. The third mode functions as a demister where, first, the airflow 110 is cooled below the dew point, condensing the air and removing moisture, by the evaporator 120. Second, the airflow 110 is heated by the heater core 130 and, if needed, the TED 140 to achieve a suitable temperature for passenger comfort.

Figure 2:
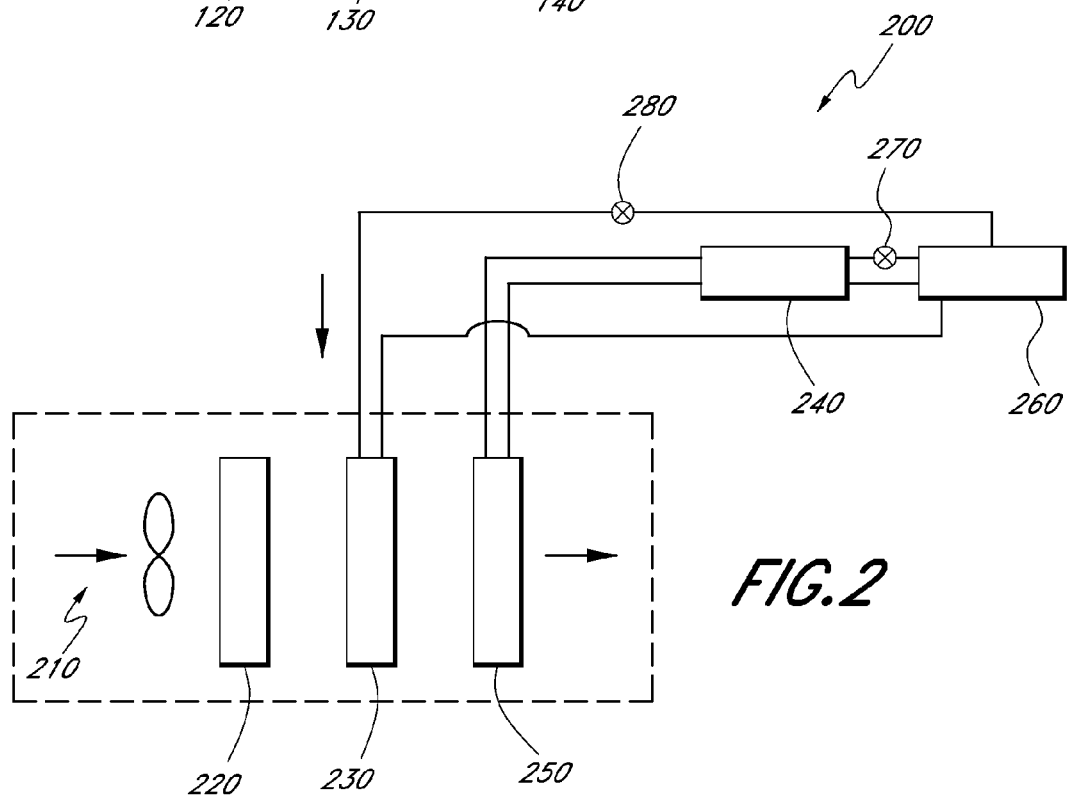
FIG. 2 illustrates a schematic illustration of another example embodiment of an HVAC architecture incorporating a thermoelectric device.

FIG. 2 illustrates an example embodiment of an HVAC system 200 including a heater core 230, an evaporator 220, a radiator 260, a thermoelectric (TE) core 250, and a thermoelectric device (TED) 240. The embodiment of the HVAC system 200 illustrated in FIG. 2 can operate in two or more modes of operation. In a first mode, which can be called a "start up heating mode," heat is provided to the passenger compartment while the engine is warming up and has not yet reached a temperature sufficient to heat the passenger compartment. When the engine is started from a cold state, it may not generate enough heat to increase the temperature within the passenger compartment sufficiently to provide a comfortable compartment climate. A vehicle engine can take several minutes or more to warm up to the desired temperature. In the first mode, a heater core valve 280 is closed and a TED valve 270 is open, thereby putting the radiator 260 in thermal communication with one side of the TED 240. The TED 240, which is also in thermal communication with the TE core 250, operates to transfer thermal energy from a radiator circuit (e.g., connecting the TED 240 to the radiator 260) to a TE core circuit (e.g., connecting the TE core 250 to the TED 240). The TE core 250 passes thermal energy to an airflow 210 entering the passenger compartment.

The system 200 can operate in the first mode until the engine warms up enough to provide sufficient heat to the comfort airflow 210. When the engine is ready to heat comfort air, the system 200 can operate in a second mode or a "steady state heating mode." In the second mode, the heater core valve 280 is open, and the heater core 230 may be used to heat the airflow 210. A demisting mode of operation can be engaged during either the start up heating mode or the steady state heating mode. In the demisting mode, the evaporator 220 can be used to dehumidify the airflow 210 before it is heated by the heater core 230 or the TE core 250, thereby permitting the system 200 to provide demisted, heated comfort air to the passenger compartment.

Figure 3:
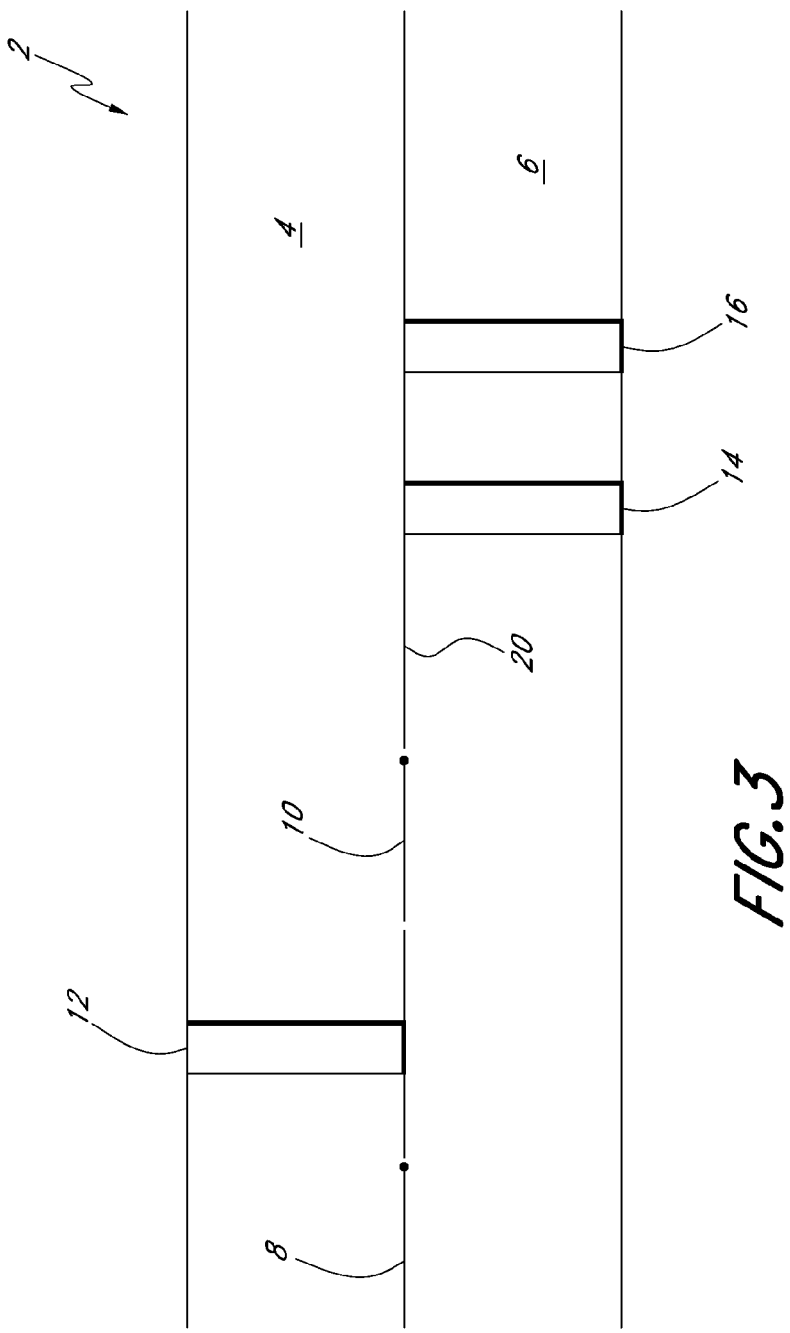
FIG. 3 illustrates a schematic illustration of an example embodiment of an HVAC system incorporating a dual channel architecture.

FIG. 3 illustrates an example embodiment of an HVAC system 2 through which an airflow 18 passes before entering the passenger compartment (not shown). The HVAC system 2 includes a cooling apparatus 12, a heater core 14, and a thermoelectric device (TED) 16. At least some of the components of the HVAC system 2 can be in fluid communication with one another via thermal energy transport means, such as fluid conducting tubes, for example. A controller can be configured to control the various components of the HVAC system 2 and their relative fluid communication. The heater core 14 is generally configured to be in thermal communication with a thermal energy source, such as a vehicle engine, a separate fuel-burning engine, an electrical heat generator, or any other heat source. Thermal energy from the heat source may be transferred via coolant through tubing to the heater core 14.

The cooling apparatus 12, such as an evaporator or a thermoelectric device, is in thermal communication with a thermal heat sink, such as a compressor-based refrigeration system, a condenser, or any other cooling system. The TED 16 can include one or more thermoelectric elements that transfer thermal energy in a particular direction when electrical energy is applied. When electrical energy is applied using a first polarity, the TED 16 transfers thermal energy in a first direction. Alternatively, when electrical energy of a second polarity opposite the first polarity is applied, the TED 16 transfers thermal energy in a second direction opposite the first direction. The TED 16 is configured such that it can be in thermal and fluid communication with a thermal energy source, such as a vehicle engine, a separate fuel-burning engine, an electrical heat generator, or any other heat source. The TED 16 is also configured such that it can be in thermal and fluid communication with thermal energy sink, such as a low temperature core or radiator, a compressor-based refrigeration system, or any other cooling system. The TED 16 is configured to either heat or cool the airflow 18 dependent upon a mode of the HVAC system 2, such as heating, cooling, or demisting.

The airflow 18 in the HVAC system 2 can flow through one or more channels or conduits. In some embodiments, a first channel 4 and a second channel 6 are separated by a partition 20. In certain embodiments, the first and second channels 4, 6 are of the same approximate size (e.g., same approximate height, length, width, and/or cross-sectional area), as shown in FIG. 3. However, in other embodiments, the first and second channels 4, 6 are of differing sizes. For example, the width, height, length, and/or cross-sectional area of the first and second channels 4, 6 can be different. In some embodiments, the first channel 4 is larger than the second channel 6. In other embodiments, the first channel 4 is smaller than the second channel 6. In further embodiments, additional partitions may be used to create any number of channels or conduits. The partitions may be of any suitable material, shape, or configuration. The partitions can serve to partially or completely separate the conduits or channels and may have apertures, gaps, valves, blend doors, other suitable structures, or a combination of structures that allow for fluid communication between channels. At least a portion of the partition can thermally insulate the first channel 4 from the second channel 6.

In certain embodiments, the HVAC system 2 comprises a first movable element configured to be operable to control the airflow passing through the first and second channels 4, 6. For example, a first blend door 8, which may also be called an inlet blend door, may be located upstream of the first and second channels 4, 6 (e.g., proximate the entrance of the first and second channels 4, 6) and is operable to control the airflow passing through the first and second channels 4, 6. The first blend door 8 can selectively modify, allow, impede, or prevent airflow through one or both of the first and second channels 4, 6. In certain configurations, the first blend door 8 can prevent airflow through one of the channels while directing all of the airflow through the other channel. The first blend door 8 can also allow airflow through both channels in varying amounts and ratios. In some embodiments, the first blend door 8 is coupled to the partition 20 and rotates relative to the partition 20. Other first movable elements are also compatible with certain embodiments disclosed herein.

A second movable element (e.g., a second blend door 10) may be positioned downstream from the cooling apparatus 12 and upstream from the heater core 14 and the TED 16. The second movable element is operable to control the airflow passing through the first and second channels 4, 6 by selectively diverting air from the first channel 4 to the second channel 6. In some embodiments, the second blend door 10 is coupled the partition 20 and rotates relative to the partition 20 between an open position, in which fluid (e.g., air) is permitted to flow between the first and second channels 4, 6, and a closed position, in which flow between the first and second channels 4, 6 is substantially impeded or prevented. The first and second blend doors 8, 10 can be controlled by the controller or a separate control system. In some embodiments, the first and second blend doors 8, 10 can operate independently from one another. Other second movable elements are also compatible with certain embodiments disclosed herein.

In the illustrated embodiment, the cooling apparatus 12 is located upstream and in a separate conduit or channel than are the heater core 14 and the thermoelectric device 16. The first and second channels 4, 6 are configured such that when the HVAC system 2 is used to selectively heat, cool, and/or demist, the first and second blend doors 8, 10 may selectively direct airflow between the first and second channels 4, 6.

In some embodiments, one or more of the cooling apparatus 12, the heater core 14, and the thermoelectric device 16 may be in thermal communication with a heat exchanger configured to be in thermal communication with the airflow.

Figure 4:
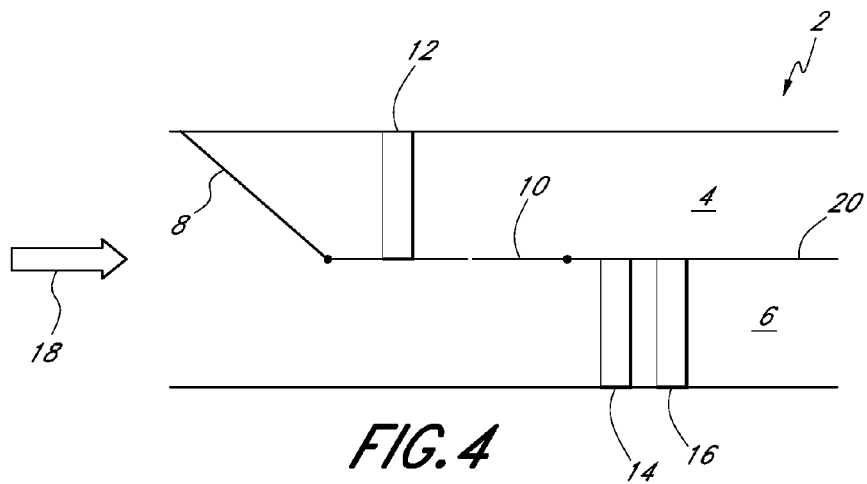
FIG. 4 illustrates a schematic illustration of an example embodiment of an HVAC system incorporating a dual channel architecture in a heating configuration.

FIG. 4 illustrates an example embodiment of an HVAC system 2 configured in a first mode, which may be called a heating mode. In this mode, a first blend door 8 is configured in a position such that it substantially prevents or blocks an airflow 18 from entering a first channel 4, thereby forcing substantially all of the airflow 18 into a second channel 6. In some embodiments, a portion of the airflow 18 may pass through the first channel 4. A second blend door 10 is configured so that it does not allow a substantial portion of the airflow 18 to pass between the first and second channels 4, 6. Preferably, in this mode, a substantial portion of the airflow 18 does not pass through a cooling apparatus 12. In this mode, the cooling apparatus 12 may be configured so that it is not in thermal communication with a thermal energy sink, such as a coolant system, whereby the resources, such as coolant, may be more efficiently used elsewhere. Additionally, directing the airflow through the second channel 6 and bypassing the cooling apparatus 12, reduces unwanted transfer of thermal energy from the airflow 15 and into the cooling apparatus 12. Even when the cooling apparatus 12 is not actively in thermal communication with a thermal heat sink, the cooling apparatus 12 will generally have a lower temperature than the airflow 18, thus, if a substantial portion of the airflow 18 would be in thermal communication with the cooling apparatus 12, the cooling apparatus 12 would undesirably lower the temperature of the airflow 18 before it is heated.

In the first mode, a heater core 14 in fluid communication with the second channel 6 is in thermal communication with a thermal heat source, such as a vehicle engine. Thermal energy transferred from the heat source to the heater core 14 is transferred to the airflow 18. Although a warm heater core 14 can sometimes supply enough thermal energy to the airflow 18 for heating the passenger compartment, a thermoelectric device (TED) 16 can be used as a supplemental or alternative thermal energy source. The TED 16, can be configured so that it is in thermal communication with the same thermal energy source as is the heater core 14, or another thermal energy source. Electric energy is supplied to the TED 16 with a polarity that transfers thermal energy to the airflow 18. In order to optimize supplemental heating, it is preferable that the TED 16 is located downstream of the heater core 14, which can decrease differences in temperature between a first thermal transfer surface (or main surface, not shown) of the TED 16 and a second thermal transfer surface (or waste surface, not shown) of the TED 16, thereby enhancing the coefficient of performance. The TED 16 is generally used for supplemental heating, however, it may be used as a primary heat source when the thermal heat source is not supplying enough heat to the heater core 14, for example, when the engine is warming up. The TED 16 may also be disengaged when the heater core 14 is supplying enough thermal energy to the airflow 18. The resulting airflow 18 is accordingly heated to a desired temperature and directed to the passenger compartment.

In some embodiments, the first blend door 8, which can also be called an inlet blend door, may be configured so that it can direct at least a portion of the airflow 18 through the second channel 6 so that the portion of the airflow 18 is heated before entering the passenger compartment. To heat the passenger compartment at a slower rate, the inlet blend door 8 can be selectively adjusted to allow less of the airflow to pass through the second channel 6 and/or allow more of the airflow to pass through the first channel 4, in which the airflow is not heated. To increase the heating rate, the blend door can be selectively adjusted so that more of the airflow is directed through the second channel 6 and less of the airflow is allowed into the first channel 4.

Figure 5:
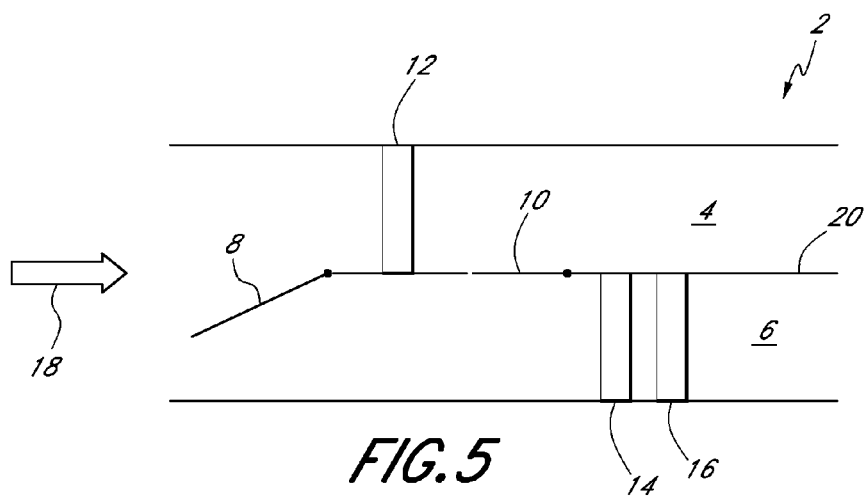
FIG. 5 illustrates a schematic illustration of an example embodiment of an HVAC system incorporating a dual channel architecture in a cooling configuration.

FIG. 5 illustrates an example embodiment of an HVAC system 2 configured in a second mode, which may be called a cooling mode. In this mode, a first blend door 8 is configured so that it can direct at least a portion of an airflow 18 (e.g., all, substantially all, or a substantial portion of an airflow 18) through a first channel 4 to which a cooling apparatus 12 is operatively connected so that the portion of the airflow 18 is cooled before entering the passenger compartment. A second blend door 10 is configured so that it does not allow a substantial portion of the airflow 18 to pass between the first and the second channels 4, 6. The amount of airflow 18 passing through the first and second channels 4, 6 may be adjusted by selectively varying the position of the first blend door 8.

In the second mode, the cooling apparatus 12, such as an evaporator, is thermally connected to a thermal heat sink (not shown), such as an auxiliary radiator, for example. In this mode, the HVAC system 2 cools the airflow 18 by transferring heat from the airflow 18 to the cooling apparatus 12. In some embodiments, a thermoelectric device (TED) 16 may be used to provide supplemental cooling to the airflow 18 in the second channel 6. The TED 16 can be configured so that it is in thermal communication with a thermal energy sink (not shown), such as a low temperature core or auxiliary radiator. Electric energy is supplied to the TED 16 with a polarity that causes the TED 16 to absorb thermal energy from the airflow and, in turn, transfer thermal energy to the thermal heat sink. In the second mode, the heater core 14 is inactive; for example, the heater core 14 is not actively in substantial thermal communication with a thermal heat source (e.g., power train coolant). In certain embodiments, activation of the heater core 14 can be controlled using a valve or other control system (not shown), and the heater core 14 can be operatively decoupled from the thermal heat source.

To cool the passenger compartment at a slower rate, the first blend door 8 can be selectively adjusted to allow less of the airflow 18 to pass through the first channel 4 and/or to allow more of the airflow 18 to pass through the second channel 6. To increase the cooling rate, the first blend door 8 can be selectively adjusted so that more of the airflow 18 is directed through the first channel 4 and less of the airflow is allowed into the second channel 6. In some embodiments, the first blend door 8 may be positioned such that it substantially prevents or blocks the airflow 18 from entering the second channel 6, thereby forcing at least a substantial portion or substantially all of the airflow 18 into the first channel 4. In certain of such embodiments, the TED 16 is operatively decoupled from the airflow 18, and the electrical energy that the TED 16 would otherwise use can be directed elsewhere.

Figure 6:
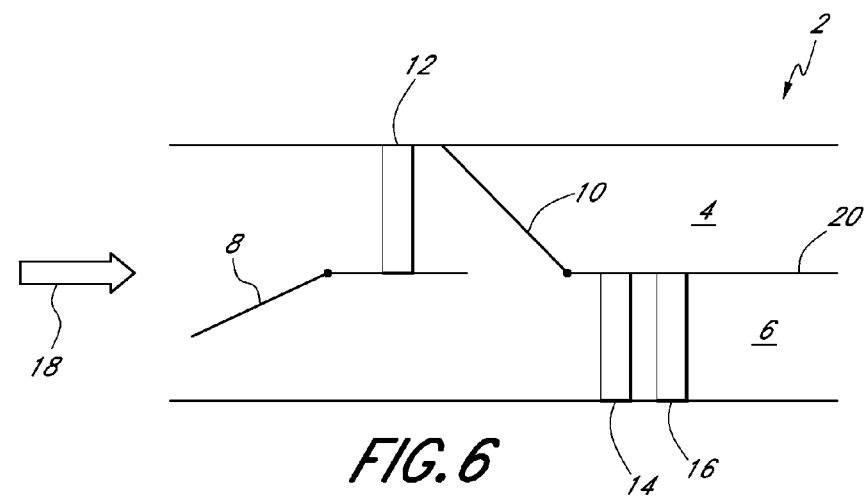
FIG. 6 illustrates a schematic illustration of an example embodiment of an HVAC system incorporating a dual channel architecture in a demisting configuration.

FIG. 6 illustrates an example embodiment of an HVAC system 2 configured in a third mode, which may be called a demisting mode. In this mode, a first blend door 8 is configured so that it can direct at least a portion of an airflow 18 (e.g., all, substantially all, or a substantial portion) through a first channel 4 with a cooling apparatus 12 so that the airflow 18 is cooled in order to remove moisture from the airflow 18. In this mode, a second blend door 10 is configured in a position such that it substantially prevents or blocks the airflow 18 from continuing through the first channel 4, thereby diverting at least a portion of the airflow 18 from the first channel 4 into a second channel 6 after the airflow 18 has passed through the cooling apparatus 12.

In the third mode, the cooling apparatus 12, such as an evaporator, can be in fluid communication with the first channel 4 and in thermal communication with a thermal heat sink, such as, for example, an auxiliary radiator (not shown). In this mode, the HVAC system 2 cools the airflow 18 by transferring heat from the airflow 18 to the cooling apparatus 12. In some embodiments, the cooling apparatus 12 may be a thermoelectric device. When the cooling apparatus 12 is a thermoelectric device, electric energy is supplied to the thermoelectric device with a polarity selected such that the TED absorbs thermal energy from the airflow 18 and adds thermal energy to a heat sink. In some embodiments, multiple thermoelectric devices are operatively connected to the HVAC system 2. In at least some such embodiments, the polarity of electrical energy directed to each TED and to each thermal zone of each TED can be controlled independently.

In the third mode, a heater core 14 is in thermal communication with a thermal heat source, such as a vehicle engine (not shown). Thermal energy transferred from the heat source to the heater core is transferred to the airflow 18. Although the heater core 14 can typically supply enough thermal energy for heating the passenger compartment, a thermoelectric device (TED) 16 can be used as a supplemental heat source. The TED 16 can be configured so that it is in thermal communication with the thermal energy source, such as the engine (not shown). Electric energy is supplied to the TED 16 with a polarity that causes the TED to transfer thermal energy to the airflow 18. In some embodiments, the efficiency of supplemental heating is increased when the TED 16 is positioned downstream of the heater core. This can decrease differences in temperature between the main surface of the TED 16 and the waste surface, thereby enhancing the coefficient of performance. When the airflow 18 is already at the desired temperature for the passenger compartment before reaching the TED 16, the TED 16 may be disengaged and its resources diverted elsewhere.

In certain embodiments described herein, the heating functionality and the cooling functionality of an HVAC system is implemented by two or more distinct subsystems that may be located at substantially different positions within an HVAC system. In some alternative embodiments, a single TED simultaneously heats and cools to achieve increased thermal conditioning, human comfort and system efficiency. This can be achieved, for example, by constructing a single TED with separate electrical zones that can be excited with user selected voltage polarities to simultaneously cool and heat comfort air. As used herein, the terms "bithermal thermoelectric device" and "bithermal TED" broadly refer to thermoelectric devices with two or more electrical zones, where the electrical zones can have any suitable electric, geometric or spatial configuration in order to achieve desired conditioning of air.

Bithermal TEDs, whether they be air to air, liquid to air, or liquid to liquid, can be designed and constructed so that the thermoelectric circuit is subdivided into a plurality of thermal zones. The thermoelectric devices may be constructed using the high density advantages taught by Bell, et al, or may be constructed using traditional technologies (see, e.g., U.S. Pat. Nos. 6,959,555 and 7,231,772). The advantages of new thermoelectric cycles, as taught by Bell, et al., may or may not be employed (see, e.g., L. E. Bell, "Alternate Thermoelectric Thermodynamic Cycles with Improved Power Generation Efficiencies," *22nd Int'l Conf. on Thermoelectrics*, Hérault, France (2003); U.S. Pat. No. 6,812,395, and U.S. Patent Application Publication No. 2004/0261829, each of which is incorporated in its entirety by reference herein).

In some embodiments, a controller or energy management system operates a bithermal TED to optimize the use of power according to ambient conditions, climatic conditions in a target compartment, and the desired environmental state of the target compartment. In a demisting application, for example, the power to the bithermal TED can be managed according to data acquired by sensors that report temperature and humidity levels so that the TED appropriately uses electric energy to condition and dehumidify the comfort air.

Some embodiments reduce the number of devices used to demist comfort air during cold weather conditions by combining two or more functions, such as, for example, cooling, dehumidification, and/or heating, into a single device. Certain embodiments improve system efficiency by providing demand-based cooling power according to climatic conditions in order to demist comfort air. In some embodiments, a cooling system provides cooling power proportional to demand. In contrast, vapor compression (VC) systems can have only one cooling power level. For example, typical VC systems either provide full cooling power or no cooling power.

Certain embodiments enable a wider range of thermal management and control by providing the ability to fine-tune comfort air temperature in an energy efficient manner. Some embodiments provide the ability to advantageously utilize thermal sinks and sources in a single device by further separating the heat exchanger working fluid loops according to sink and source utilization.

Figures 7, 8:
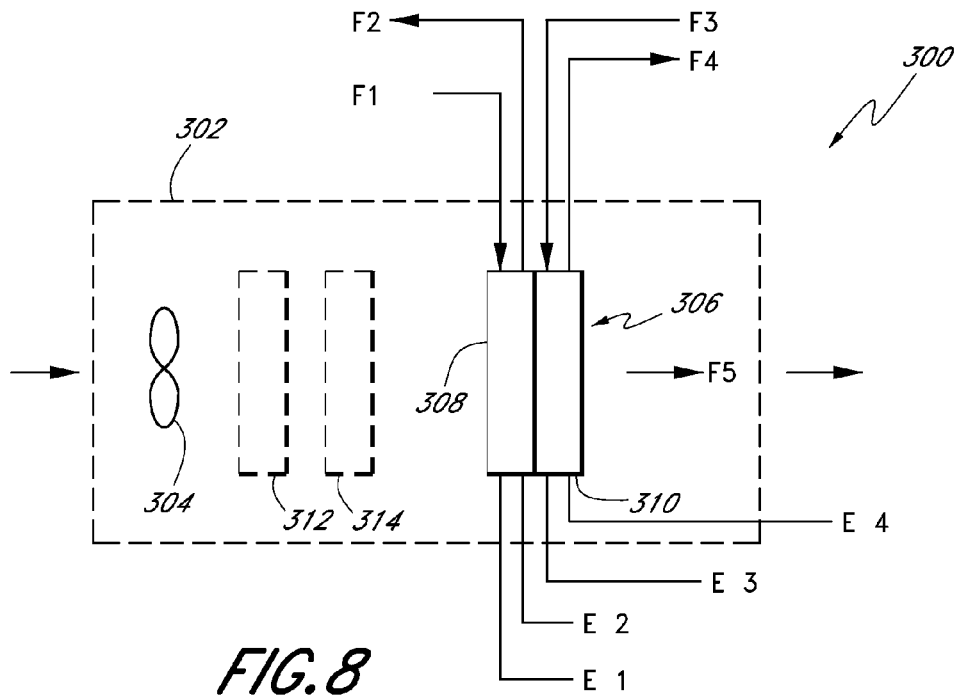
FIG. 7 is a chart related to an example embodiment of an HVAC system incorporating a bithermal thermoelectric device.
FIG. 8 is a schematic illustration of an example embodiment of an HVAC system incorporating a bithermal thermoelectric device.

In the example HVAC system 300 illustrated in FIGS. 7-8, heating and cooling functionality is implemented in a unitary or substantially contiguous heater-cooler subsystem 306 having a first thermal zone 308 and a second thermal zone 310. In some embodiments, the heater-cooler subsystem 306 is a bithermal thermoelectric device (or bithermal TED). Each of the first thermal zone 308 and the second thermal zone 310 can be configured to selectively heat or cool a comfort airstream F5 independently. Further, each of the thermal zones 308, 310 can be supported by an independently configurable electrical network and working fluid network. A controller (not shown) can be configured to control the electrical networks and working fluid networks in order to operate the heater-cooler subsystem 306 in one of a plurality of available modes. For example, the controller can adjust the electrical and working fluid networks of the HVAC system 300 according to the configurations shown in the table of FIG. 7 when a demisting, heating, or cooling mode is selected.

Any suitable technique can be used to select a mode of operation for the HVAC system 300. For example, a mode of operation may be selected at least in part via a user interface presented to an operator for selecting one or more settings, such as temperature, fan speed, vent location, and so forth. In some embodiments, a mode of operation is selected at least in part by a controller that monitors one or more sensors for measuring passenger compartment temperature and humidity. The controller can also monitor sensors that detect ambient environmental conditions. The controller can use information received from sensors, user controls, other sources, or a combination of sources to select among demisting, heating, and cooling modes. Based on the selected mode of operation, the controller can operate one or more pumps, fans, power supplies, valves, compressors, other HVAC system components, or combinations of HVAC system components to provide comfort air having desired properties to the passenger compartment.

In the example embodiment illustrated in FIG. 8, the HVAC system 300 includes an air channel 302, a fan 304 configured to direct an airflow F5 through the air channel 302, a bithermal TED 306 configured to heat, cool, and/or demist the airflow F5 flowing through the air channel 302, an optional cooling apparatus 312 configured to cool the airflow F5, an optional heating apparatus 314 configured to heat the airflow F5, a power supply (not shown), electrical connections E1-E4 connected between the power supply and the bithermal TED 306, a heat source (not shown), a heat sink (not shown), working fluid conduits F1-F4 configured to carry working fluids between the bithermal TED 306 and one or more heat sources or sinks, other HVAC system components, or any suitable combination of components. The heat source can include one or more repositories of waste heat generated by a motor vehicle, such as, for example, power train coolant, a motor block, a main radiator, exhaust system components, a battery pack, another suitable material, or a combination of materials. The heat sink can include an auxiliary radiator (for example, a radiator not connected to the power train coolant circuit), a thermal storage device, another suitable material, or a combination of materials.

In a demisting mode of operation, the first thermal zone 308 of the bithermal TED 306 cools and dehumidifies comfort air F5. A controller causes a power supply to provide electric power in a first polarity (or cooling polarity) via a first electrical circuit E1-E2 connected to the first thermal zone 308. The controller causes the first working fluid circuit F1-F2 connected to the high temperature side of the first thermal zone 308 of the TED 306 to be in thermal communication with a heat sink, such as, for example, an auxiliary radiator. The polarity of electric power provided to the first thermal zone 308 of the TED 306 causes thermal energy to be directed from the comfort air F5 to the first working fluid circuit F1-F2.

In the demisting mode, the second thermal zone 310 of the bithermal TED 306 heats the dehumidified comfort air F5 after the air has passed through the first thermal zone 308. The controller causes a power supply to provide electric power in a second polarity (or heating polarity) via a second electrical circuit E3-E4 connected to the second thermal zone 310. The controller causes the second working fluid circuit F3-F4 connected to the low temperature side of the second thermal zone 310 of the TED 306 to be in thermal communication with a heat source, such as, for example, power train coolant. The polarity of electric power provided to the second thermal zone 310 of the TED 306 causes thermal energy to be directed from the second working fluid circuit F3-F4 to the comfort air F5. The controller can regulate the thermal energy transferred to or from the comfort air F5 in each thermal zone in order to cause the comfort air F5 to reach a desired temperature and/or humidity. The comfort air F5 can then be directed to the passenger compartment.

When a heating mode of operation is selected, the first and second thermal zones 308, 310 of the bithermal TED 306 both heat comfort air F5. A controller causes a power supply to provide electric power in a heating polarity via first and second electrical circuits E1-E4 connected to the thermal zones 308, 310. The controller causes the working fluid circuits F1-F4 connected to the low temperature side of the TED 306 to be in thermal communication with a heat source, such as, for example, power train coolant. The polarity of electric power provided to both thermal zones 308, 310 of the bithermal TED 306 causes thermal energy to be directed from the working fluid circuits F1-F4 to the comfort air F5.

When a cooling mode of operation is selected, the first and second thermal zones 308, 310 of the bithermal TED 306 both cool comfort air F5. A controller causes a power supply to provide electric power in a cooling polarity via first and second electrical circuits E1-E4 connected to the thermal zones 308, 310. The controller causes the working fluid circuits F1-F4 connected to the high temperature side of the TED 306 to be in thermal communication with a heat sink, such as, for example, an auxiliary radiator. The polarity of electric power provided to both thermal zones 308, 310 of the bithermal TED 306 causes thermal energy to be directed from the comfort air F5 to the working fluid circuits F1-F4.

The HVAC system 300 illustrated in FIGS. 7-8 can optionally include a cooling apparatus 312, such as, for example, an evaporator, and a heating apparatus 314, such as, for example, a heater core. The cooling apparatus 312 and the heating apparatus 314 can be configured to supplement or replace one or more of the cooling, demisting and heating functions of the bithermal TED 306 while the HVAC system is operated in a particular mode. For example, a heater core 314 can be used to heat the comfort air F5 instead of the bithermal TED 306 when the power train coolant has reached a sufficiently high temperature to make the comfort air F5 reach a desired temperature when it passes through the heater core 314. While the example embodiment illustrated in FIG. 8 shows that the cooling apparatus 312 and/or the heating apparatus 314 can be positioned upstream from the bithermal TED 306, it is understood that at least one of the cooling apparatus 312 and the heating apparatus 314 can be positioned downstream from the bithermal TED 306. For example, in some embodiments, when the HVAC system 300 is operated in a demisting mode, at least one of the thermal zones 308, 310 of the bithermal TED 306 can be used to cool or dehumidify the comfort air F5 while a heating apparatus positioned downstream from the TED 306 heats the dehumidified air.

In an example embodiment of a heater-cooler 400 illustrated in FIGS. 9-11, a first fluid stream F1 passes through two heat exchange zones 404, 410 located on a first side of a bithermal TED having two thermoelectric circuit zones 402, 408. A second fluid stream F2 passes through two heat exchange zones 406, 412 located on a second side of the bithermal TED. Each of the first thermoelectric circuit zone 402 and the second thermoelectric circuit zone 408 can be configured to selectively transfer thermal energy in a desired direction independently from each other. Further, each of the thermoelectric circuit zones 402, 408 can be connected to an independently configurable electric circuit paths E1-E2, E3-E4. A controller can be configured to control the electrical networks E1-E4 and fluid streams F1-F2 in order to operate the heater-cooler 400 in one of a plurality of available modes. For example, the controller can adjust the electrical networks of the heater-cooler 400 according to the configurations shown in the table of FIG. 9 when a demisting, heating, or cooling mode is selected.

Any suitable technique can be used to select a mode of operation for the heater-cooler 400, including the techniques described previously with respect to the HVAC system 300 shown in FIGS. 7-8.

In the example embodiment illustrated in FIGS. 10-11, the heater-cooler 400 includes a first pair of heat exchange zones 404, 406 in thermal communication with opposing sides of a first thermoelectric circuit zone 402. A second pair of heat exchange zones 410, 412 is in thermal communication with opposing sides of a second thermoelectric circuit zone 408. The first and second thermoelectric circuit zones 402, 408 are configured to heat, cool, and/or demist fluids flowing through the heat exchange zones. A power supply (not shown) can provide power to each of the thermoelectric circuit zones 402, 408 using independent electric circuit paths E1-E2, E3-E4. The heater-cooler can include fluid conduits configured to carry fluid streams F1-F2 through the heat exchange zones 404 and 410, 406 and 412 in thermal communication with the TED.

In a demisting mode of operation, the first thermoelectric circuit zone 402 of the heater-cooler 400 cools a main fluid stream F1 flowing through the first heat exchange zone 404 of a main fluid conduit. A controller causes a power supply to provide electric power in a first polarity (or cooling polarity) via a first electrical circuit E1-E2 connected to the first thermoelectric circuit zone 402. A working fluid stream F2 flowing through the first heat exchange zone 406 of a working fluid conduit removes heat from the high temperature side of the first thermoelectric circuit zone 402. The working fluid stream F2 can flow counter to the direction of flow of the main fluid stream F1 as the fluid streams F1-F2 traverse the heater-cooler 400. The polarity of electric power provided to the first thermoelectric circuit zone 402 of the heater-cooler 400 causes thermal energy to be directed from the main fluid stream F1 to the working fluid stream F2. In some embodiments, the working fluid stream F2 is in thermal communication with a heat sink, such as, for example, an auxiliary radiator. In alternative embodiments, the controller can cause the working fluid stream F2 to be directed to a target compartment along with the main fluid stream F1 when the demisting mode is selected.

In the demisting mode, the second thermoelectric circuit zone 408 of the heater-cooler 400 heats the main fluid stream F1 after the fluid has passed through the first heat exchange zone 404 and while the fluid flows through the second heat exchange zone 410 of the main fluid conduit. The controller causes a power supply to provide electric power in a second polarity (or heating polarity) via a second electrical circuit E3-E4 connected to the second thermoelectric circuit zone 408. The working fluid stream F2 flowing through the second heat exchange zone 412 of the working fluid conduit is in thermal communication with the low temperature side of the second thermoelectric circuit zone 408. When the direction of working fluid stream F2 flow is counter to the direction of main fluid stream F1 flow, the working fluid stream F2 passes through the second heat exchange zone 412 before flowing to the first heat exchange zone 406 of the working fluid conduit. The polarity of electric power provided to the second thermoelectric circuit zone 408 of the heater-cooler 400 causes thermal energy to be directed from the working fluid stream F2 to the main fluid stream F1.

When a heating mode of operation is selected, one or both of the first and second thermoelectric circuit zones 402, 408 of the heater-cooler 400 heat the main fluid stream F1 flowing through the first and second heat exchange zones 404, 410 of the main fluid conduit. A controller causes a power supply to provide electric power in a heating polarity via first and second electrical circuits E1-E4 connected to the thermoelectric circuit zones 402, 408. The working fluid stream F2 flowing through the first and second heat exchange zones 406, 412 transfers heat to the low temperature side of the thermoelectric circuit zones 402, 408. In some embodiments, a controller causes the working fluid stream F2 to be in thermal communication with a heat source, such as, for example, power train coolant, when the heating mode is selected. The polarity of electric power provided to the first and second thermoelectric circuit zones 402, 408 of the heater-cooler 400 causes thermal energy to be directed from the working fluid stream F2 to the main fluid stream F1. In some embodiments, electric power is provided to only one of the thermoelectric circuit zones 402, 408 when it is determined that the main fluid stream F1 can reach a desired temperature without both thermoelectric circuit zones 402, 408 being active.

When a cooling mode of operation is selected, the first and second thermoelectric circuit zones 402, 408 of the heater-cooler 400 both cool the main fluid stream F1 flowing through the first and second heat exchange zones 404, 410 of the main fluid conduit. A controller causes a power supply to provide electric power in a cooling polarity via first and second electrical circuits E1-E4 connected to the thermoelectric circuit zones 402, 408. The working fluid stream F2 flowing through the first and second heat exchange zones 406, 412 removes heat from the high temperature side of the thermoelectric circuit zones 402, 408. In some embodiments, a controller causes the working fluid stream F2 to be in thermal communication with a heat sink, such as, for example, an auxiliary radiator, when the cooling mode is selected. The polarity of electric power provided to the first and second thermoelectric circuit zones 402, 408 of the heater-cooler 400 causes thermal energy to be directed from the main fluid stream F1 to the working fluid stream F2. In some embodiments, electric power is provided to only one of the thermoelectric circuit zones 402, 408 when it is determined that the main fluid stream F1 can reach a desired temperature without both thermoelectric circuit zones 402, 408 being active.

Reference throughout this specification to "some embodiments," "certain embodiments," or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics may be combined in any suitable manner, as would be apparent to one of ordinary skill in the art from this disclosure, in one or more embodiments.

For purposes of illustration, some embodiments have been described in the context of providing comfort air the passenger compartment of a vehicle, an aircraft, a train, a bus, a truck, a hybrid vehicle, an electric vehicle, a ship, or any other carrier of persons or things. It is understood that the embodiments disclosed herein are not limited to the particular context or setting in which they have been described and that at least some embodiments can be used to provide comfort air to homes, offices, industrial spaces, and other buildings or spaces. It is also understood that at least some embodiments can be used in other contexts where temperature-controlled fluids can be used advantageously, such as in managing the temperature of equipment.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

Although the invention presented herein has been disclosed in the context of certain preferred embodiments and examples, it will be understood by those skilled in the art that the invention extends beyond the specifically disclosed embodiments to other alternative embodiments and/or uses of the invention and obvious modifications and equivalents thereof. Thus, it is intended that the scope of the invention herein disclosed should not be limited by the particular embodiments described above, but should be determined only by a fair reading of the claims that follow.

What is claimed is:

1. A system for controlling temperature in a region, the system comprising:
    at least one main fluid channel;
    at least one thermoelectric device operatively connected to the at least one main fluid channel, the at least one thermoelectric device comprising at least one thermoelectric element configured to heat at least a portion of a fluid flowing in at least one of the main fluid channels upon application of electrical energy in a first polarity and to cool at least a portion of the fluid upon application of electrical energy in a second polarity;
    a first working fluid circuit;
    a second working fluid circuit independently configurable from the first working fluid circuit;
    wherein the at least one thermoelectric device is subdivided into a plurality of thermal zones, the plurality of thermal zones comprising:
        a first thermal zone operatively connected to a first electric circuit switchable between the first polarity and the second polarity; and
        a second thermal zone operatively connected to a second electric circuit switchable between the first polarity and the second polarity independent of the polarity of the first electric circuit;
    at least a first heat exchanger disposed in the main fluid channel and thermally connected to a first main surface in the first thermal zone of the thermoelectric device;
    at least a second heat exchanger disposed in the main fluid channel and thermally connected to a second main surface in the second thermal zone of the thermoelectric device;
    at least a third heat exchanger disposed in the first working fluid circuit and thermally connected to a first waste surface; and
    at least a fourth heat exchanger disposed in the second working fluid circuit and thermally connected to a second waste surface;
    wherein the first working fluid circuit is thermally connected to the first waste surface in the first thermal zone of the thermoelectric device and the second working fluid circuit is thermally connected to the second waste surface in the second thermal zone of the thermoelectric device, wherein the system is configured to deliver a fluid flow that is heated, cooled, or demisted to the region, and wherein the first working fluid circuit is independently configurable from the second working fluid circuit when the system is demisting the fluid flow; and
    wherein the thermoelectric device is configured to transfer thermal energy between the first main surface and the first waste surface in the first thermal zone and to transfer thermal energy between the second main surface and the second waste surface in the second thermal zone.

2. The system of claim 1, further comprising a controller configured to operate the system in one of a plurality of available modes by controlling the polarity of the first electric circuit and the polarity of the second electric circuit.

3. The system of claim 2, wherein the plurality of available modes comprises a demisting mode, a heating mode, and a cooling mode.

4. The system of claim 3, wherein the controller is configured to operate the first electric circuit in the second polarity and the second electric circuit in the first polarity when the system is operating in the demisting mode.

5. The system of claim 1, wherein each of the first working fluid circuit and the second working fluid circuit is selectively connected between either the thermoelectric device and a heat sink or the thermoelectric device and a heat source.

6. The system of claim 1, wherein the first working fluid circuit is connected to a heat source when the first electric circuit is switched to the first polarity and is connected to a heat sink when the first electric circuit is switched to the second polarity; and wherein the second working fluid circuit is connected to the heat source when the second electric circuit is switched to the first polarity and is connected to the heat sink when the second electric circuit is switched to the second polarity.

7. The system of claim 1, further comprising a controller configured to operate the system in a demisting mode by switching the first electric circuit to the second polarity and switching the second electric circuit to the first polarity.

8. A method of delivering temperature controlled fluid to a region using an HVAC system, the method comprising:
    operating the system in one of a plurality of available modes to provide a fluid flow to the region, the plurality of available modes comprising a demisting mode, a heating mode, and a cooling mode;
    delivering fluid to the region during the demisting mode of operation by:
        directing a fluid flow into a main fluid channel of a thermoelectric device;
        removing thermal energy from at least a portion of the fluid flow in a first thermal zone of the thermoelectric device by circulating a first working fluid in a first working fluid circuit; and
        subsequently adding thermal energy to at least the portion of the fluid flow in a second thermal zone of the thermoelectric device by circulating a second working fluid in a second working fluid circuit independently configurable from the first working fluid circuit;
        wherein the first working fluid circuit connects the thermoelectric device to a heat sink and the second working fluid circuit connects the thermoelectric device to a heat source when the HVAC system is demisting the fluid flow in the main fluid channel;
    delivering fluid to the region during the heating mode of operation by:
        directing a fluid flow into the main fluid channel of the thermoelectric device; and
        adding thermal energy to at least a portion of the fluid flow in at least one of the first thermal zone and the second thermal zone of the thermoelectric device; and
    delivering fluid to the region during the cooling mode of operation by:
        directing a fluid flow into the main fluid channel of the thermoelectric device; and
        removing thermal energy from at least a portion of the fluid flow in at least one of the first thermal zone and the second thermal zone of the thermoelectric device.

9. The method of claim 8, wherein the first working fluid is connected to a heat sink and the second working fluid is connected to a heat source when the system is operating in the demisting mode.

10. The method of claim 8, wherein each of the first working fluid and the second working fluid comprises a liquid heat transfer fluid.

11. The method of claim 10, wherein the first working fluid comprises an aqueous solution and the second working fluid comprises the same aqueous solution.

12. The method of claim 8, wherein delivering the fluid during the heating mode further comprises:
   providing electrical energy having a first polarity to the first thermal zone of the thermoelectric device; and
   providing electrical energy having the same polarity to the second thermal zone of the thermoelectric device;
   wherein the electrical energy provided to the thermoelectric device causes thermal energy to be transferred from at least one working fluid to the at least a portion of the fluid flow via the thermoelectric device.

13. A method of manufacturing a system for conditioning fluid in a region, the method comprising:
   providing at least one fluid flow channel;
   operatively connecting at least one thermoelectric device to the at least one fluid flow channel comprising:
      disposing at least one first heat exchanger in the at least one fluid flow channel;
      disposing at least one second heat exchanger in the at least one fluid flow channel;
      providing a first working fluid channel in thermal communication with a first waste surface of the at least one thermoelectric device;
      providing a second working fluid channel independently configurable from the first working fluid channel and in thermal communication with a second waste surface of the at least one thermoelectric device;
      connecting a first electric circuit to a first thermal zone of the at least one thermoelectric device, the first electric circuit configured to selectively supply electrical power to the first thermal zone in a first polarity or in a second polarity; and
      connecting a second electric circuit to a second thermal zone of the at least one thermoelectric device, the second electric circuit configured to selectively supply electrical power to the second thermal zone in the first polarity or in the second polarity;
   wherein operatively connecting the at least one thermoelectric device to the at least one fluid flow channel further comprising:
      connecting the first thermal zone of the at least one thermoelectric device to the at least one first heat exchanger comprising connecting a main surface in the first thermal zone to the at least one first heat exchanger, the main surface being opposite a waste surface in the first thermal zone; and
      connecting the second thermal zone of the at least one thermoelectric device to the at least one second heat exchanger;
   wherein the system is configured to deliver fluid that is heated, cooled, or demisted to the region, and wherein the first working fluid channel is independently configurable from the second working fluid channel when the system is demisting the fluid.

14. The method of claim 13, further comprising providing a controller configured to control the system at least in part by selecting the polarity of the first electric circuit and the polarity of the second electric circuit.

15. The method of claim 13, further comprising configuring each of the first working fluid channel and the second working fluid channel to selectively move thermal energy between the at least one thermoelectric device and a heat source or a heat sink.

16. The method of claim 13, wherein the region comprises a passenger compartment of a vehicle.

17. The system of claim 1, wherein the first working fluid circuit connects the thermoelectric device to a heat sink and the second working fluid circuit connects the thermoelectric device to a heat source when the system is demisting the fluid flow.

18. The system of claim 17, wherein the heat sink is a radiator and the heat source is power train coolant.

19. The system of claim 1, wherein the first working fluid circuit is physically independent from the second working fluid circuit when the system is heating or cooling the fluid flow.

20. The system of claims 1, wherein the first working fluid circuit and the second working fluid circuit connect the thermoelectric device to a same heat source when the system is heating the fluid flow.

21. The system of claim 1, wherein the at least one thermoelectric device is substantially contiguous between the first thermal zone and the second thermal zone.

22. The system of claim 1, wherein the first waste surface and the second waste surface are substantially contiguous.

23. The system of claim 1, wherein the first main surface of the first thermal zone and the second main surface of the second thermal zone of the at least one thermoelectric device control a temperature of the same fluid flow.

24. The system of claim 3, wherein the controller is configured to thermally connect:
   in the demisting mode, the first fluid circuit to a heat sink and the second fluid circuit to a heat source;
   in the heating mode, the first fluid circuit to the heat source and the second fluid circuit to the heat source;
   in the cooling mode, the first fluid circuit to the heat sink and the second fluid circuit to the heat sink.

* * * * *

UNITED STATES PATENT AND TRADEMARK OFFICE
CERTIFICATE OF CORRECTION

| | | |
|---|---|---|
| PATENT NO. | : 8,613,200 B2 | Page 1 of 1 |
| APPLICATION NO. | : 12/605249 | |
| DATED | : December 24, 2013 | |
| INVENTOR(S) | : John LaGrandeur and Lon E. Bell | |

It is certified that error appears in the above-identified patent and that said Letters Patent is hereby corrected as shown below:

In the Claims

In column 22 at line 32, In Claim 20, change "claims" to --claim--.

Signed and Sealed this
Seventh Day of April, 2015

Michelle K. Lee
*Director of the United States Patent and Trademark Office*